(12) United States Patent
Watanabe

(10) Patent No.: US 12,235,819 B2
(45) Date of Patent: Feb. 25, 2025

(54) AUTO FAULT TREE GENERATION SYSTEM

(71) Applicant: HITACHI, Ltd., Tokyo (JP)

(72) Inventor: Tsubasa Watanabe, Spring Lake, MI (US)

(73) Assignee: HITACHI, Ltd., Tokyo (JP)

( * ) Notice: Subject to any disclaimer, the term of this patent is extended or adjusted under 35 U.S.C. 154(b) by 0 days.

(21) Appl. No.: 18/200,860

(22) Filed: May 23, 2023

(65) Prior Publication Data

US 2024/0394237 A1 Nov. 28, 2024

(51) Int. Cl.
*G06F 16/22* (2019.01)
*G06F 16/28* (2019.01)

(52) U.S. Cl.
CPC ........ *G06F 16/2246* (2019.01); *G06F 16/284* (2019.01)

(58) Field of Classification Search
CPC ............................ G06F 16/2246; G06F 16/284
USPC ......................................................... 707/797
See application file for complete search history.

(56) References Cited

U.S. PATENT DOCUMENTS

| 2003/0004915 A1* | 1/2003 | Lin | G06F 16/36 |
| 2004/0073404 A1* | 4/2004 | Brooks | G05B 19/409 |
| | | | 702/183 |
| 2022/0058323 A1* | 2/2022 | Heilmann | G06F 30/3323 |

FOREIGN PATENT DOCUMENTS

JP 6674831 B2 4/2020

* cited by examiner

*Primary Examiner* — Kuen S Lu
(74) *Attorney, Agent, or Firm* — Procopio, Cory, Hargreaves & Savitch LLP

(57) ABSTRACT

Example implementations as described herein are directed to generate a fault tree with a design document and minimized rules or database. The fault tree generation system may utilize assembly data and ladder programs as input and generates a fault tree by connecting an upper part of the fault tree generated from an assembly tree structure in the assembly data and a lower part of a fault tree from control logic in the ladder program. The fault tree is generated by connecting the lower part of the tree of the fault tree from the logic.

15 Claims, 37 Drawing Sheets

1600

| Full Path (FP) 1 | Insert machine/ |
|---|---|
| FP2 | Insert machine/Conveyer assembly/ |
| FP3 | Insert machine/Conveyer assembly/PartA Conveyer assembly |
| FP4 | Insert machine/Conveyer assembly/PartB Conveyer assembly |
| FP5 | Insert machine/Safety assembly/ |
| FP6 | Insert machine/Insert assembly/ |
| FP7 | Insert machine/Insert assembly/Clump Cylinder assembly |

| Top Node (TN) 1 | Material Name |
|---|---|
| TN2 | PartBConveyerAdvanceRequest |
| TN3 | ClumperOnRequest |
| TN4 | CylinderAdvanceRequest |
| TN5 | CylinderReturnRequest |
| TN6 | InsertReturnRequest |
| TN7 | InsertAdvanceRequest |

FIG. 17

| Matching words count | | \multicolumn{8}{c}{Words B group} |
|---|---|---|---|---|---|---|---|---|
| | | TN1 | TN2 | TN3 | TN4 | TN5 | TN6 | TN7 | Average |
| Words A group | FP1 | 0 | 0 | 0 | 0 | 0 | 1 | 1 | 0.29 |
| | FP2 | 1 | 1 | 0 | 0 | 0 | 1 | 1 | 0.57 |
| | FP3 | 3 | 2 | 0 | 0 | 0 | 1 | 1 | 1.00 |
| | FP4 | 2 | 3 | 0 | 0 | 0 | 1 | 1 | 1.00 |
| | FP5 | 0 | 0 | 0 | 0 | 0 | 1 | 1 | 0.29 |
| | FP6 | 0 | 0 | 0 | 1 | 1 | 2 | 2 | 0.57 |
| | FP7 | 0 | 0 | 1 | 1 | 1 | 2 | 2 | 1.00 |

FIG. 18

| Difference from Mean of Matching words count | | Words B group | | | | | | |
|---|---|---|---|---|---|---|---|---|
| | | TN1 | TN2 | TN3 | TN4 | TN5 | TN6 | TN7 |
| Words A group | FP1 | -0.29 | -0.29 | -0.29 | -0.29 | -0.29 | 0.71 | 0.71 |
| | FP2 | 0.43 | 0.43 | -0.57 | -0.57 | -0.57 | 0.43 | 0.43 |
| | FP3 | 2.00 | 1.00 | -1.00 | -1.00 | -1.00 | 0.00 | 0.00 |
| | FP4 | 1.00 | 2.00 | -1.00 | -1.00 | -1.00 | 0.00 | 0.00 |
| | FP5 | -0.29 | -0.29 | -0.29 | -0.29 | -0.29 | 0.71 | 0.71 |
| | FP6 | -0.57 | -0.57 | -0.57 | -0.57 | -0.57 | 1.43 | 1.43 |
| | FP7 | -1.00 | -1.00 | 0.00 | 0.00 | 0.00 | 1.00 | 1.00 |

| Difference from Mean of Matching words count | | Words B group | | | | | | |
|---|---|---|---|---|---|---|---|---|
| | | TN1 | TN2 | TN3 | TN4 | TN5 | TN6 | TN7 |
| Words A group | FP1 | -0.29 | -0.29 | -0.29 | -0.29 | -0.29 | 0.71 | 0.71 |
| | FP2 | 0.43 | 0.43 | -0.57 | -0.57 | -0.57 | 0.43 | 0.43 |
| | FP3 | 2.00 | 1.00 | -1.00 | -1.00 | -1.00 | 0.00 | 0.00 |
| | FP4 | 1.00 | 2.00 | -1.00 | -1.00 | -1.00 | 0.00 | 0.00 |
| | FP5 | -0.29 | -0.29 | -0.29 | -0.29 | -0.29 | 0.71 | 0.71 |
| | FP6 | -0.57 | -0.57 | -0.57 | -0.57 | -0.57 | 1.43 | 1.43 |
| | FP7 | -1.00 | -1.00 | 0.00 | 0.00 | 0.00 | 1.00 | 1.00 |

| | TN1 | TN2 | TN3 | TN4 | TN5 | TN6 | TN7 |
|---|---|---|---|---|---|---|---|
| FP1 | Insert machine/ | | | | | | |
| FP2 | Insert machine/Conveyer assembly/ | X | | | | | | |
| FP3 | Insert machine/Conveyer assembly/PartA Conveyer assembly | | X | | | | | |
| FP4 | Insert machine/Conveyer assembly/PartB Conveyer assembly | | | | | | | |
| FP5 | Insert machine/Safety assembly/ | | | | | | | |
| FP6 | Insert machine/Insert assembly/ | | | X | X | X | X | X |
| FP7 | Insert machine/Insert assembly/Clump Cylinder assembly | ✓ | ✓ | ✓ | ✓ | ✓ | ✓ | ✓ |

Column headers (TN1–TN7): PartAConveyerAdvanceRequest, PartBConveyerAdvanceRequest, ClamperOnRequest, CylinderAdvanceRequest, CylinderReturnRequest, InsertReturnRequest, InsertAdvanceRequest Accurate matching check →

☐ X : Selected block
▨ : Correct block
✓ : ?/?

| DRW # | Material Name |
|---|---|
| DRW000001 | Insert machine |
| DRW000002 | Conveyer assembly |
| DRW000003 | Process Start Push Button |
| DRW000004 | Process Stop Push Button |
| DRW000005 | PartA Conveyer assembly |
| DRW000006 | Servo Motor II |
| DRW000007 | Conveyer Belt JI |
| DRW000008 | PartA Fixture |
| DRW000009 | Laser senor KI |

| Group - # | Node name |
|---|---|
| Drive unit - 01 | Motor |
| Drive unit - 02 | Air Cylinder |
| Drive unit - 03 | Solenoid |
| Drive unit - 04 | Clumper |
| - | - |
| - | - |
| Measurement unit - 01 | Sensor |
| Measurement unit - 02 | Curtain |
| Measurement unit - 03 | Load Cell |
| Measurement unit - 04 | Switch |
| Measurement unit - 05 | Laser |
| Measurement unit - 06 | Proximity |
| - | - |
| - | - |
| User Interface unit - 01 | Button |
| User Interface unit - 02 | Touch panel |
| - | - |
| - | - |

| Group - # | Variable name |
|---|---|
| Drive unit - 01 | Request |
| Drive unit - 02 | Rotate |
| Drive unit - 03 | Clump |
| - | - |
| Measurement unit - 01 | Laser |
| Measurement unit - 02 | Sensor |
| Measurement unit - 03 | LS |
| Measurement unit - 04 | Curtain |
| Measurement unit - 05 | LC |
| Measurement unit - 06 | Safety Relay |
| Measurement unit - 07 | Sr |
| - | - |
| User Interface unit - 01 | Button |
| User Interface unit - 02 | Push |
| User Interface unit - 03 | PB |
| - | - |

| Full Path (FP) 1 | Common group | Insert machine/ |
|---|---|---|
| FP2 | Common group | Insert machine/Conveyer assembly/ |
| FP3 | User interface unit | Insert machine/Conveyer assembly/Process Start Push Button |
| FP4 | User interface unit | Insert machine/Conveyer assembly/Process Stop Push Button |
| FP5 | Common group | Insert machine/Conveyer assembly/PartA Conveyer assembly |
| FP6 | Drive unit | Insert machine/Conveyer assembly/PartA Conveyer assembly/Servo Motor II |
| FP7 | Measurement unit | Insert machine/Conveyer assembly/PartA Conveyer assembly/Laser sensor KI |
| FP8 | Measurement unit | Insert machine/Conveyer assembly/PartA Conveyer assembly/Laser sensor KI |
| FP9 | Common group | Insert machine/Conveyer assembly/PartB Conveyer assembly |
| FP10 | Drive unit | Insert machine/Conveyer assembly/PartB Conveyer assembly/Servo Motor II |
| FP11 | Measurement unit | Insert machine/Conveyer assembly/PartB Conveyer assembly/Laser sensor KI |
| FP12 | Common group | Insert machine/Safety assembly |
| FP13 | Measurement unit | Insert machine/Safety assembly/Light Curtain sensor KJ |
| FP14 | User interface unit | Insert machine/Safety assembly/Estop Push Button |
| FP15 | Common group | Insert machine/Insert assembly/ |
| FP16 | Common group | Insert machine/Insert assembly/Clump Cylinder assembly |
| FP17 | Drive unit | Insert machine/Insert assembly/Clump Cylinder assembly/Clumper JJ |
| FP18 | Drive unit | Insert machine/Insert assembly/Clump Cylinder assembly/Servo Motor II |
| FP19 | Measurement unit | Insert machine/Insert assembly/Clump Cylinder assembly/Laser sensor KI |
| FP20 | Measurement unit | Insert machine/Insert assembly/Clump Cylinder assembly/Laser sensor KI |
| FP21 | Drive unit | Insert machine/Insert assembly/Servo Motor II |

FIG. 33

| Top Node (TN) 1 | Drive unit | PartAConveyerAdvanceRequest |
|---|---|---|
| TN2 | Drive unit | PartBConveyerAdvanceRequest |
| TN3 | Drive unit | ClamperOnRequest |
| TN4 | Drive unit | CylinderOnRequest |
| TN5 | Drive unit | CylinderReturnRequest |
| TN6 | Drive unit | InsertReturnRequest |
| TN7 | Drive unit | InsertAdvanceRequest |
| TN8 | User interface unit | ProcessStopPB |
| TN9 | User interface unit | ProcessStartPB |
| TN10 | Measurement unit | SafetyRelayReleased |
| TN11 | Measurement unit | PartAExistLS |
| TN12 | Measurement unit | PartBExistLS |
| TN13 | Measurement unit | PartBinPartALS |
| TN14 | Measurement unit | ClamperHomeLS |
| TN15 | Measurement unit | ClamperReachLS |

FIG. 34

AUTO FAULT TREE GENERATION SYSTEM

BACKGROUND

Field

The present disclosure is directed to systems and method involving automatic generation of fault trees.

Related Art

Maintaining the production line uptime in a factory to maximize productivity is essential. A factor in reducing line uptime is machine fault due to some anomaly state, such that prompt recovery action is required based on the root cause analysis of the machine fault. For this purpose, fault tree analysis is commonly performed using a fault tree. The fault tree is a tree diagram comprising a top node indicating a fault event, a lower node indicating root cause phenomena, and one or more branches indicating causality of phenomena. The fault tree is effective because a root cause may be determined immediately in instances where a fault is described in the fault tree, which may reduce or eliminate prolonged downtime.

An equipment designer may manually generate a fault tree because it requires equipment architecture to describe causality. If the equipment includes actuators and/or sensors, a commonly programmable logic controller is used to control the equipment with a ladder program, which can realize high-reliability behavior. These kinds of equipment are designed by not only mechanical engineers but also electrical and control engineers, such that a fault tree is generated by each of the different design team involved. This collaboration work involves an enormous amount of time and the shortage of such specialists is serious these days. To solve the aforementioned issues, several related art implementations have been proposed.

In one example related art describes a system that has a causal database that stores equipment fault events and their causal relationships from past failure events and also owns the names of component parts to which these causal relationships relate as indexes. In this system, by entering the part names when constructing a Fault Tree, the related causal relationships are displayed, and the Fault Tree can be constructed efficiently.

The above example may construct a fault tree by utilizing past accumulated information, but as a precondition, it is necessary to accumulate past fault event information on similar products. Therefore, there is an issue that cannot be addressed for newly constructed equipment or line. Another issue is that it takes a great deal of time to build a causal relationship database in the first place.

SUMMARY

The present disclosure involves the automatic generation of fault trees.

Therefore, the present disclosure proposes a system that automatically constructs a fault tree using conventional design documents, such as mechanical design drawings and control programs, and minimized rules or database which can generate from design documents without using information such as prepared causal information, which does not yet exist for newly designed equipment or line.

To address the issues of the related art, the example implementations described herein involve the following aspects.

Example implementation described herein involve a novel technique for the automatic generation of fault trees. The fault tree generation system takes assembly data containing equipment or line assembly trees and ladder programs containing equipment or line control logic as input and generates a fault tree by connecting the upper part of the fault tree generated from the assembly tree structure in the assembly data and the lower part of the fault tree from the control logic in the ladder program. The fault tree is generated by connecting the lower part of the tree of the fault tree from the logic.

In an example implementation involving the fault tree generation system, the system is configured to generate a fault tree by connecting the fault tree's upper part and the fault tree's lower part by connecting both fault trees based on the number of words contained in the full path of the fault tree's upper part and the top of path word of the fault tree lower part.

In an example implementation involving the fault tree generation system, the system is configured to extract major components from the assembly tree comprised in the assembly data using a part name database indicating each actuator, each sensor, component, or the like, in addition to the assembly structure when generating the upper part of the fault tree.

In an example implementation involving the fault tree generation system, the system is configured to extract major variables from the control logic when generating the lower part of the fault tree, using the read and write variable name database for each actuator, each sensor, component, or the like, and extracts the tree structure by converting the ladder associated with the major variables.

In an example implementation involving the fault tree generation system, a part name database and variable name database of the fault tree generation system may have part names and variable names grouped in common groups, respectively, and the fault tree generation system, wherein the connection of both trees is made within the common grouping.

Aspects of the present disclosure include a method that involves receiving, as input, assembly data and one or more ladder programs, wherein the assembly data comprises equipment or line assembly trees and the one or more ladder programs comprising equipment or line control logic; and generating a fault tree associated with an equipment architecture based on an assembly tree structure comprised in the assembly data and a control logic comprised in the one or more ladder programs.

Aspects of the present disclosure further include a computer program storing instructions that involve receiving, as input, assembly data and one or more ladder programs, wherein the assembly data comprises equipment or line assembly trees and the one or more ladder programs comprising equipment or line control logic; and generating a fault tree associated with an equipment architecture based on an assembly tree structure comprised in the assembly data and a control logic comprised in the one or more ladder programs.

Aspects of the present disclosure include a system that involves means for receiving, as input, assembly data and one or more ladder programs, wherein the assembly data comprises equipment or line assembly trees and the one or more ladder programs comprising equipment or line control logic; and means for generating a fault tree associated with an equipment architecture based on an assembly tree structure comprised in the assembly data and a control logic comprised in the one or more ladder programs.

Aspects of the present disclosure involve an apparatus to facilitate an automatic generation of a fault tree, the apparatus involving a processor, configured to receive, as input, assembly data and one or more ladder programs, wherein the assembly data comprises equipment or line assembly trees and the one or more ladder programs comprising equipment or line control logic; and generate a fault tree associated with an equipment architecture based on an assembly tree structure comprised in the assembly data and a control logic comprised in the one or more ladder programs.

BRIEF DESCRIPTION OF DRAWINGS

FIG. 16 is a diagram illustrating an example processing result of the flow chart of FIG. 11.

FIG. 17 is a diagram illustrating an example processing result of the flow chart of FIG. 11.

FIG. 18 is a diagram illustrating an example processing result of the flow chart of FIG. 11.

FIG. 19 is a diagram illustrating an example processing result of the flow chart of FIG. 11.

FIG. 20 is a diagram illustrating an example processing result of the flow chart of FIG. 11.

FIG. 21 is a diagram illustrating an example matching accuracy.

FIG. 25 is a diagram illustrating an example assembly data.

FIG. 29 is a diagram illustrating an example of a grouped node name database.

FIG. 31 is a diagram illustrating an example of a grouped node name database.

FIG. 33 is a diagram illustrating an example processing result of the flow chart of FIG. 23.

FIG. 34 is a diagram illustrating an example processing result of the flow chart of FIG. 23.

DETAILED DESCRIPTION

Figure 1:
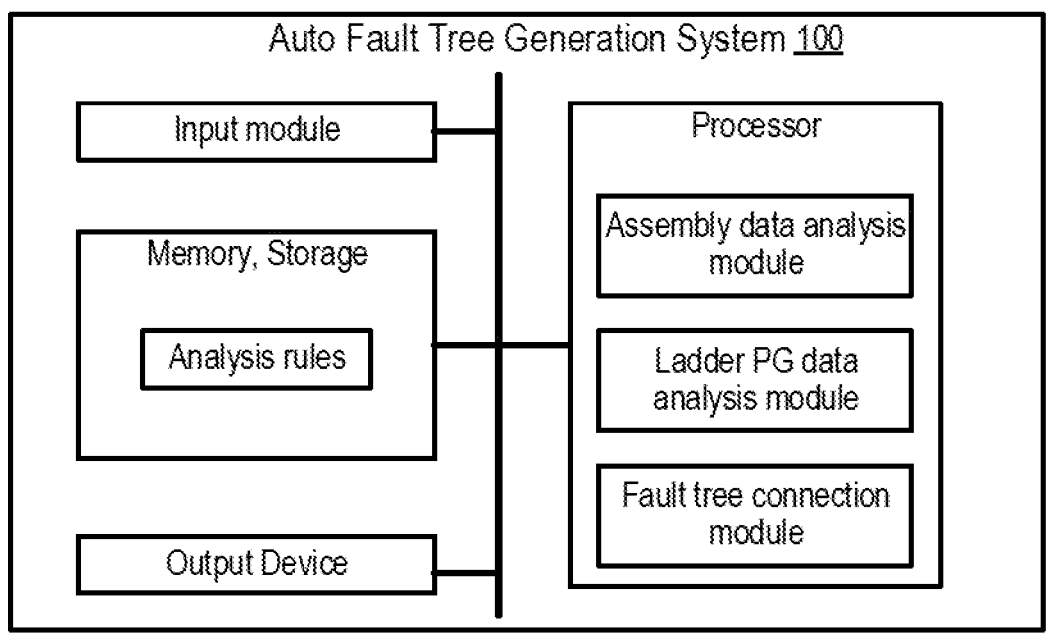
FIG. 1 is a diagram illustrating an example architecture of an auto fault tree generation system.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations Detailed Description will be described by way of three examples. The first example may describe the system overview, as shown for example in FIGS. 1 and 2. The second example may describe an example equipment, as shown for example in FIGS. 3-10, which may include the assembly tree and ladder program. The third example may describe an example flow chart and processing flow using the example equipment data in FIGS. 12-22.

Figure 2:
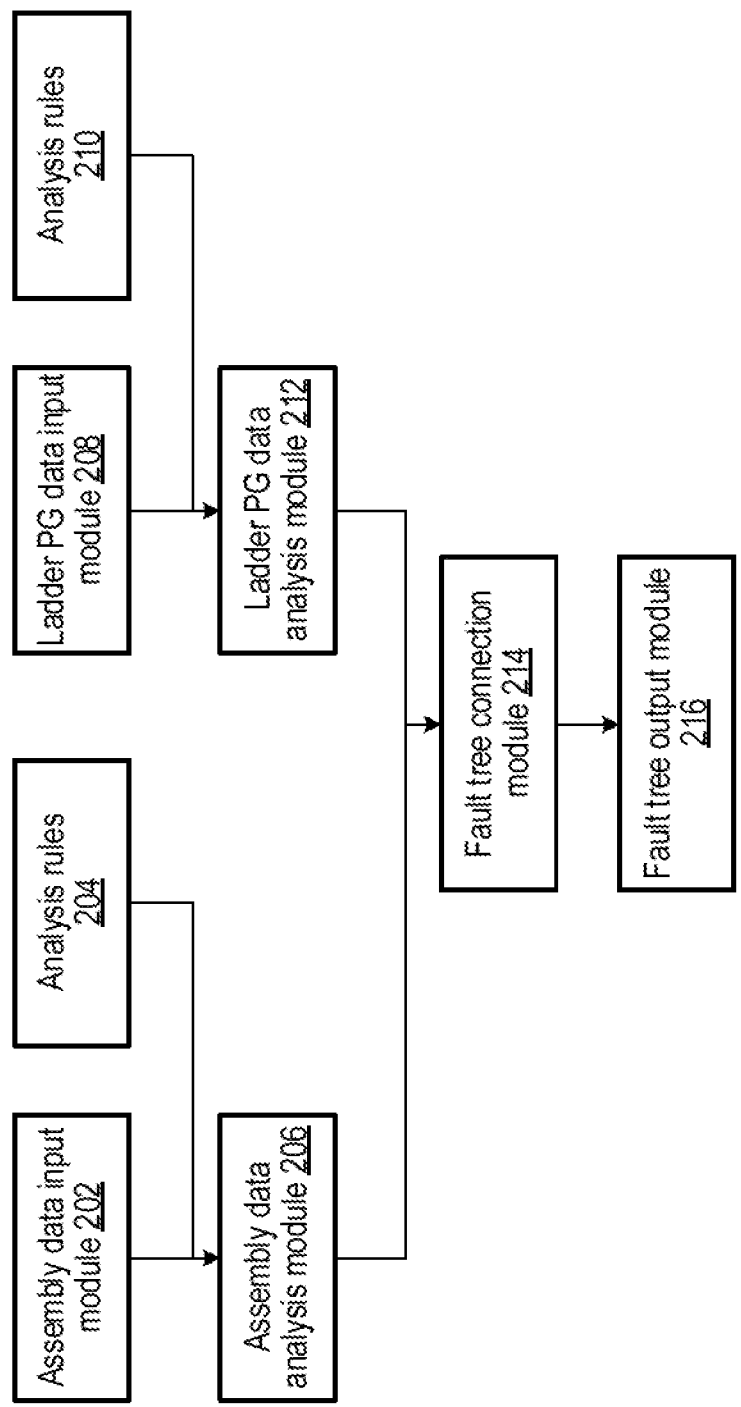
FIG. 2 is a diagram illustrating an example of a block diagram of the auto fault tree generation system.

FIG. 1 shows an example of a system architecture of an auto fault tree generation system 100. The auto fault tree generation system may comprise a processor configured to operate one or more modules related to the auto fault tree generation system, such as, but not limited to an assembly data analysis module, a ladder data analysis module, or a fault tree connection module. The processor may communicate with an input module, an output device, or memory/storage that may comprise analysis rules. FIG. 2 shows an example of a block diagram of the system. As described in FIG. 2, the system inputs may comprise assembly data, such as CAD data, and ladder program. The assembly data analysis module 206 may receive input from an assembly data input module 202 and corresponding analysis rules 204. The ladder data analysis module 212 may receive input from a ladder data input module 208 and corresponding analysis rules 210. The fault tree connection module 214 may analyze both input data from the assembly data analysis module and the ladder analysis module to translate to a tree diagram, which includes nodes and branches. After each translation, connect both modules to one tree in the connection module to construct the final fault tree as the system's output. The fault tree output module 216 may receive input from the fault tree connection module in the formation of the tree generation.

Figure 3:
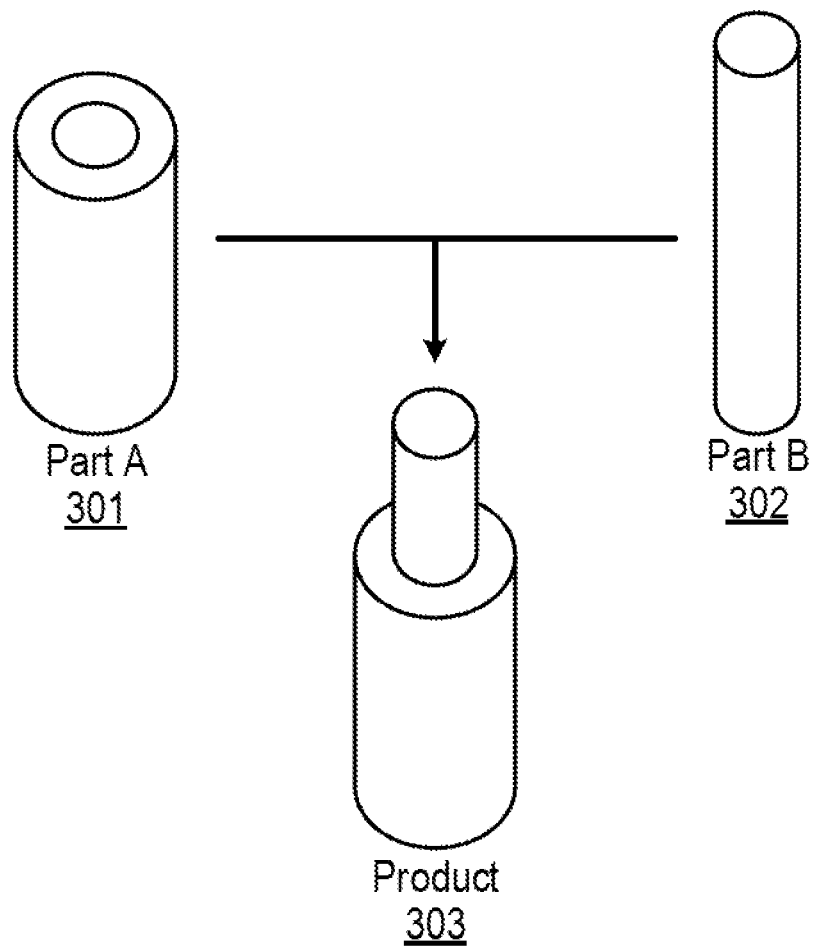
FIG. 3 is a diagram illustrating an example of part and product assembled by example equipment.
Figure 4:
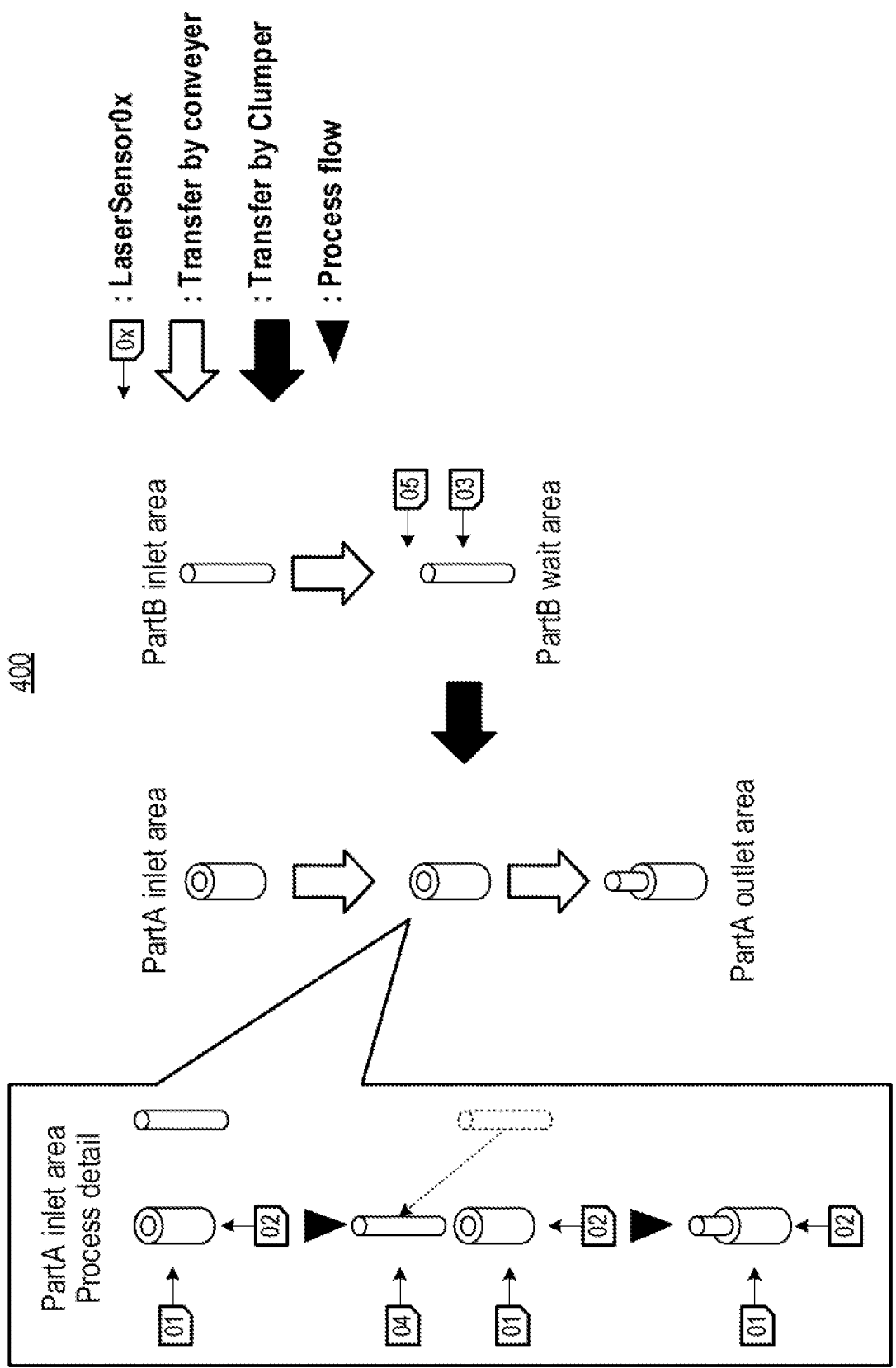
FIG. 4 is a diagram illustrating an example overview of equipment, part movement, and related sensors.

FIG. 3 shows an example of parts and products that may be assembled by example equipment. For example, the part A 301 and the part B 302 may be components of an assembled product 303. In the example of FIG. 3, part A and part B may be coupled or connected in order to assemble the product. FIG. 4 shows an overview 400 of equipment movement, part movement, and related sensors. The example of FIG. 4 shows an example process of movement of part A 301 and part B 302 in order to assemble product 303.

Figure 5:
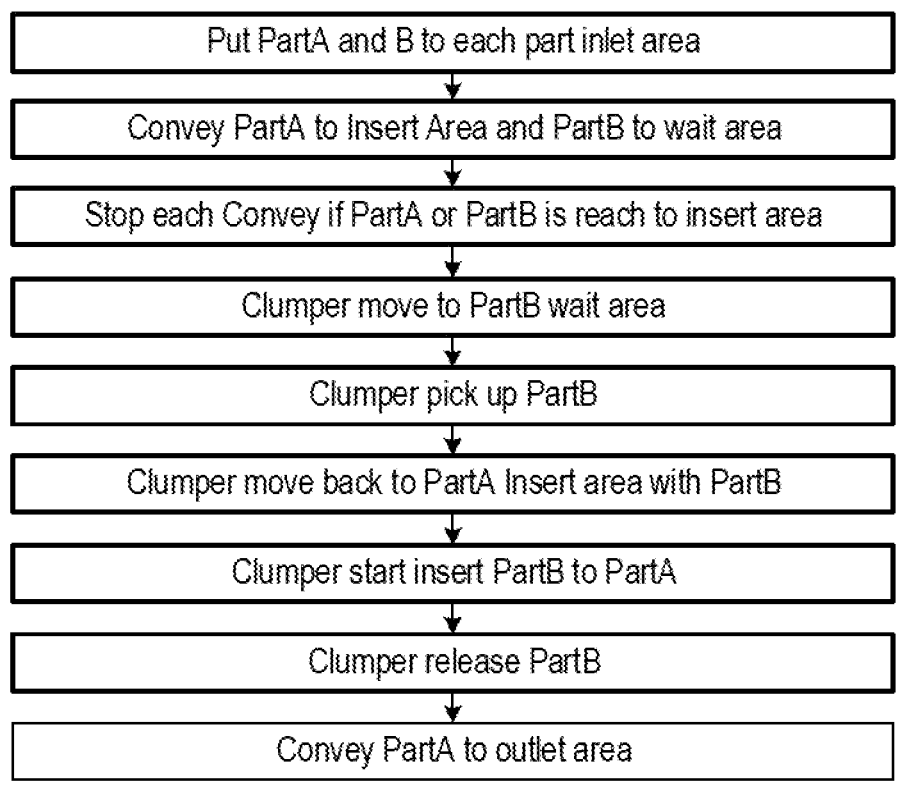
FIG. 5 is a diagram illustrating an example process flowchart of the example equipment.

FIG. 5 shows a diagram 500 of a process flow chart of example equipment. A function of example equipment is inserting Part B to Part A to assemble the product. The process of movement of the parts, shown in FIG. 4, may include a conveyer process and a transferring process for the insertion or connection of part B with part A. Such convey and transferring processes may include one or more motors for conveyors and/or insert process, a clumper for clumping Part B, and an air cylinder for transferring Part B for the insertion process. Laser sensors may be utilized to detect each part and equipment movement, and/or to ensure proper assembly. An example process may include placing part A and part B to a respective part inlet area. Part A may then be conveyed to an insert area, while part B is conveyed to a wait area. The convey process may stop when part A or part B reach a respective designated area, such as an insert area. The clumper may then position part B to a wait area. The clumper may then pick up the part B, and move part B to the part A insert area. The clumper may insert part B into part A, and part B may be released upon insertion of part B into part A. The insertion may be based on a preconfigured movement or distance. The assembled product may then be conveyed to an outlet area.

Figure 6:
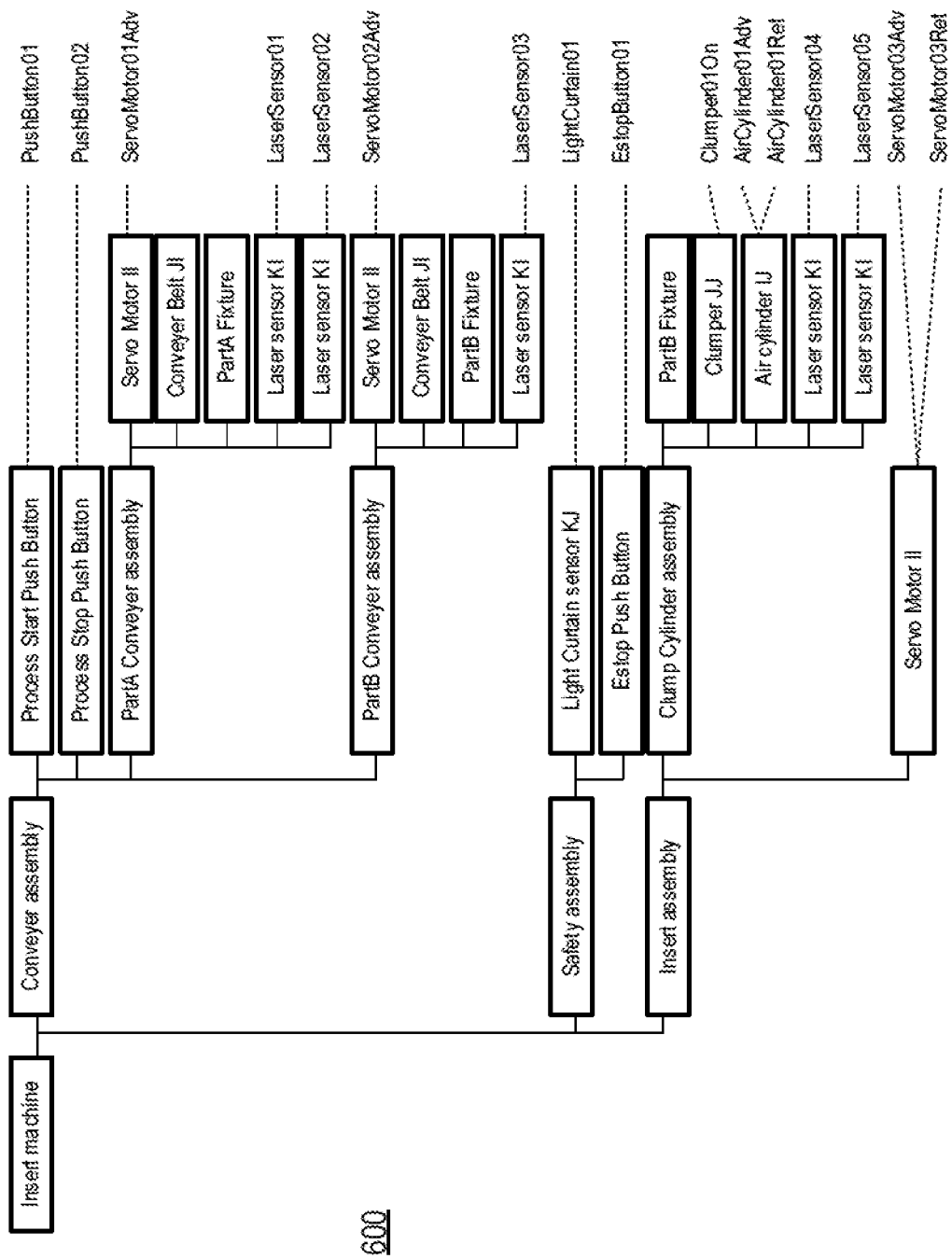
FIG. 6 is a diagram illustrating an example assembly data and related input/output variables in a ladder program.

FIG. 6 shows a diagram 600 of the Assembly tree, which may be comprised in CAD data, and related input/output variables in the ladder program. An assembly tree may comprise both assembly and part, and the assembly tree is generated by a designer. The automated equipment may comprise user interfaces such as a push button and safety components such as a light curtain and emergency stop (E-stop) button. Components, such as the driving unit and sensing unit, may have electrical connection to a controller. The controller is a Programmable Logic Controller (PLC), and the programing language (e.g., Ladder program) may utilize the variables shown, for example, in FIG. 6.

Figure 7:
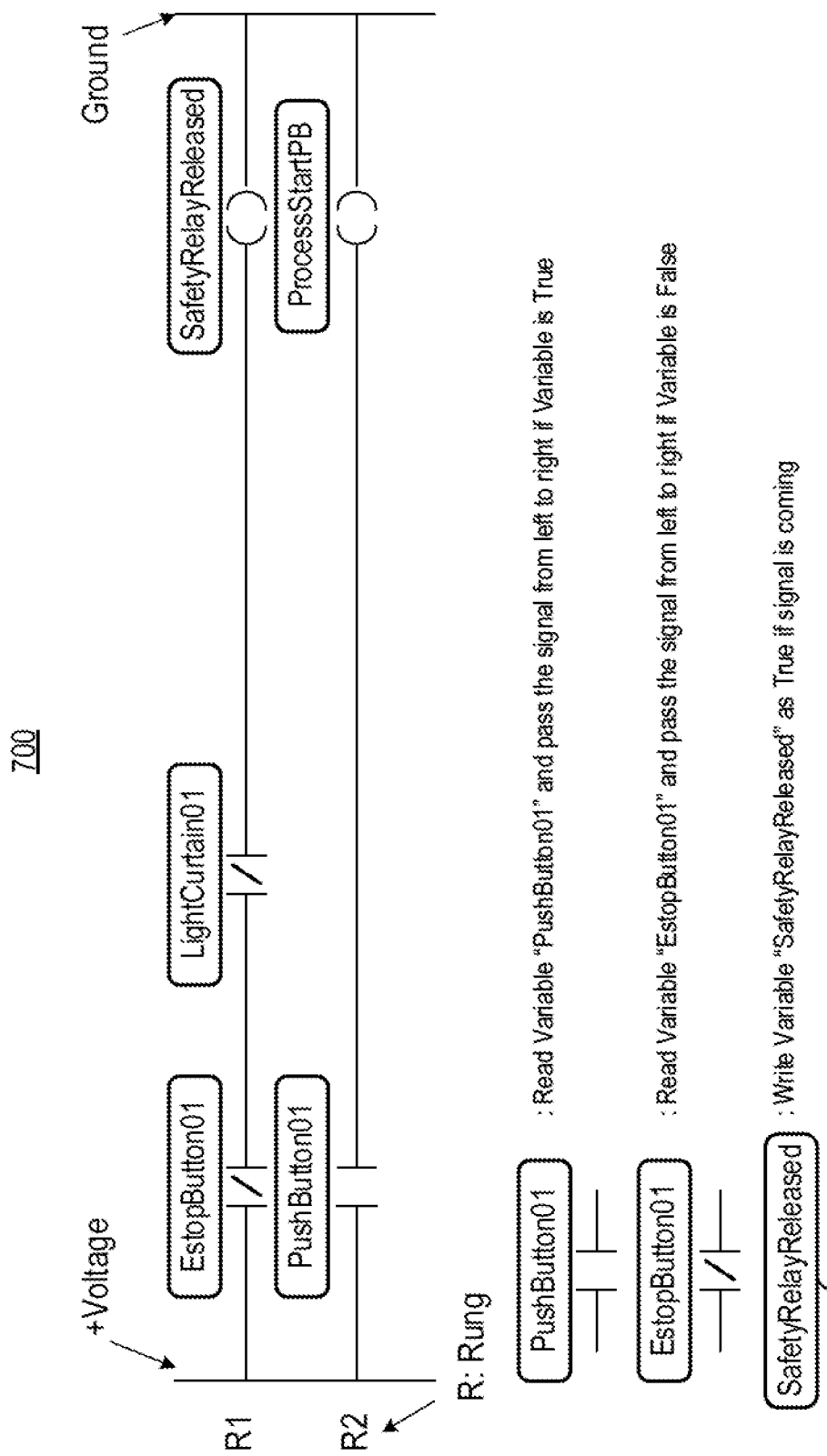
FIG. 7 is a diagram illustrating an example of the ladder program.

FIG. 7 is an example of a ladder program 700. The ladder program may document the design and construction of relay racks as used in manufacturing and process control. The name is based on the observation that programs in this language resemble ladders, with two vertical rails and a series of horizontal rungs between them. The signal is coming from the +Voltage side, and is trying to go to the Ground side. If logic is cleared, the variables can be changed. The program starts from the top rung and repeats the program, as needed, until the bottom rung is reached.

Figure 8:
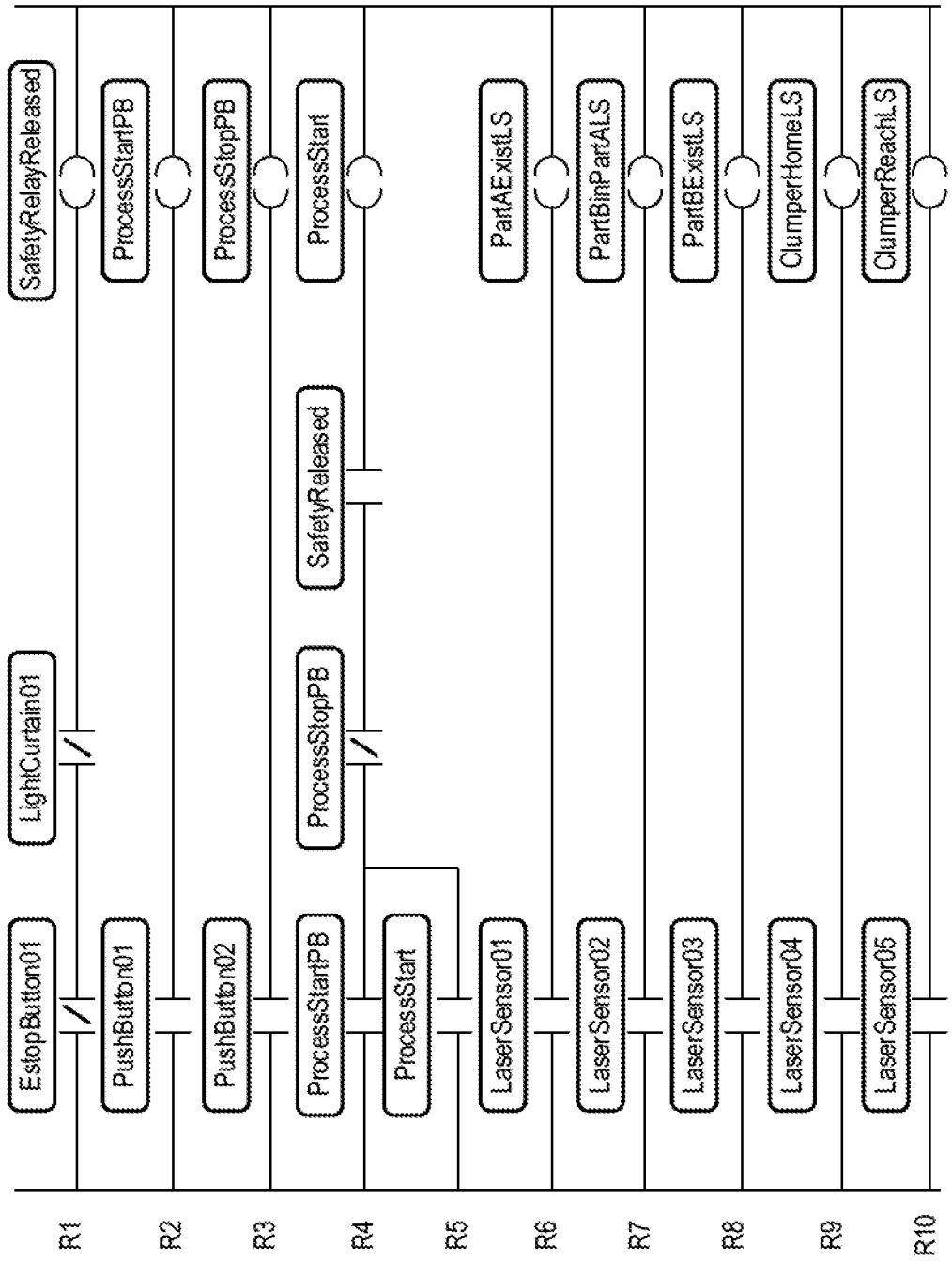
FIG. 8 is a diagram illustrating an example of the ladder program.
Figure 9:
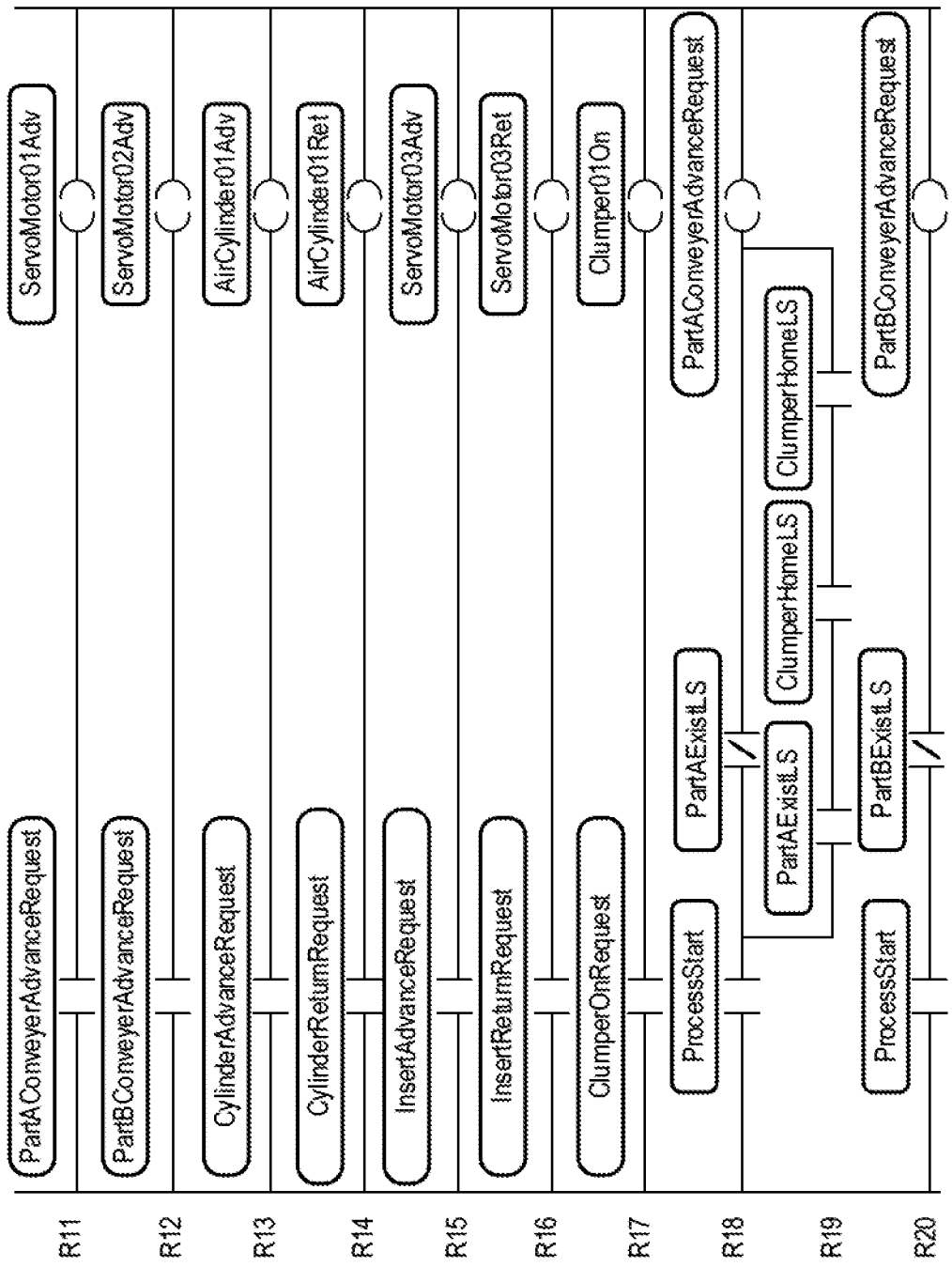
FIG. 9 is a diagram illustrating an example of the ladder program.
Figure 10:
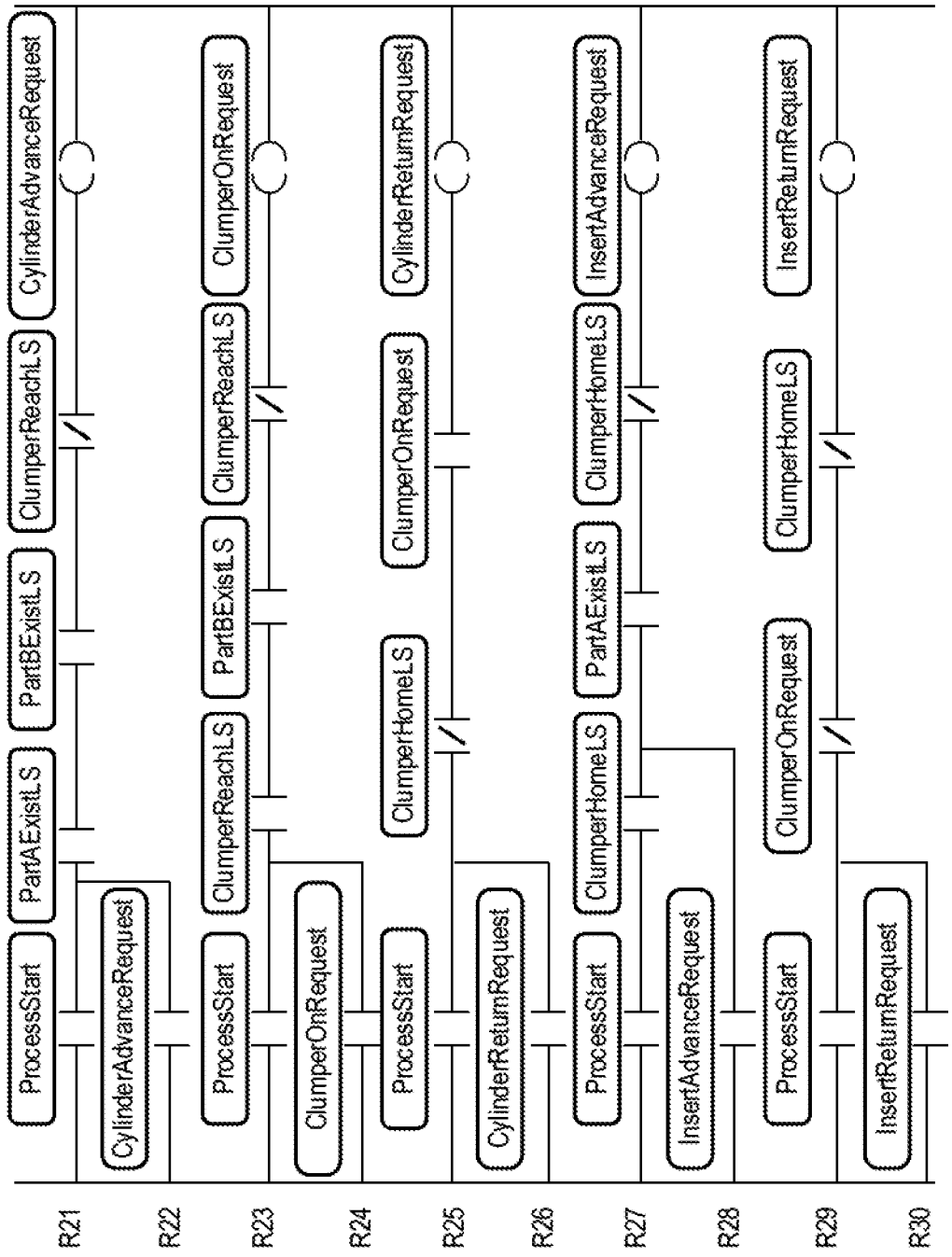
FIG. 10 is a diagram illustrating an example of the ladder program.

FIGS. 8-10 show an example ladder program that may be utilized to achieve the process flow in this equipment, as shown in connection with FIGS. 4 and 5. The rungs R1-17 may comprise variable definition area of input and output, while rungs R18-20 may comprise the control logic of both conveyors, rungs R21-26 may comprise the control logic of Part B transfer, and rungs R27-30 may comprise the control logic of the insert process.

Figure 11:
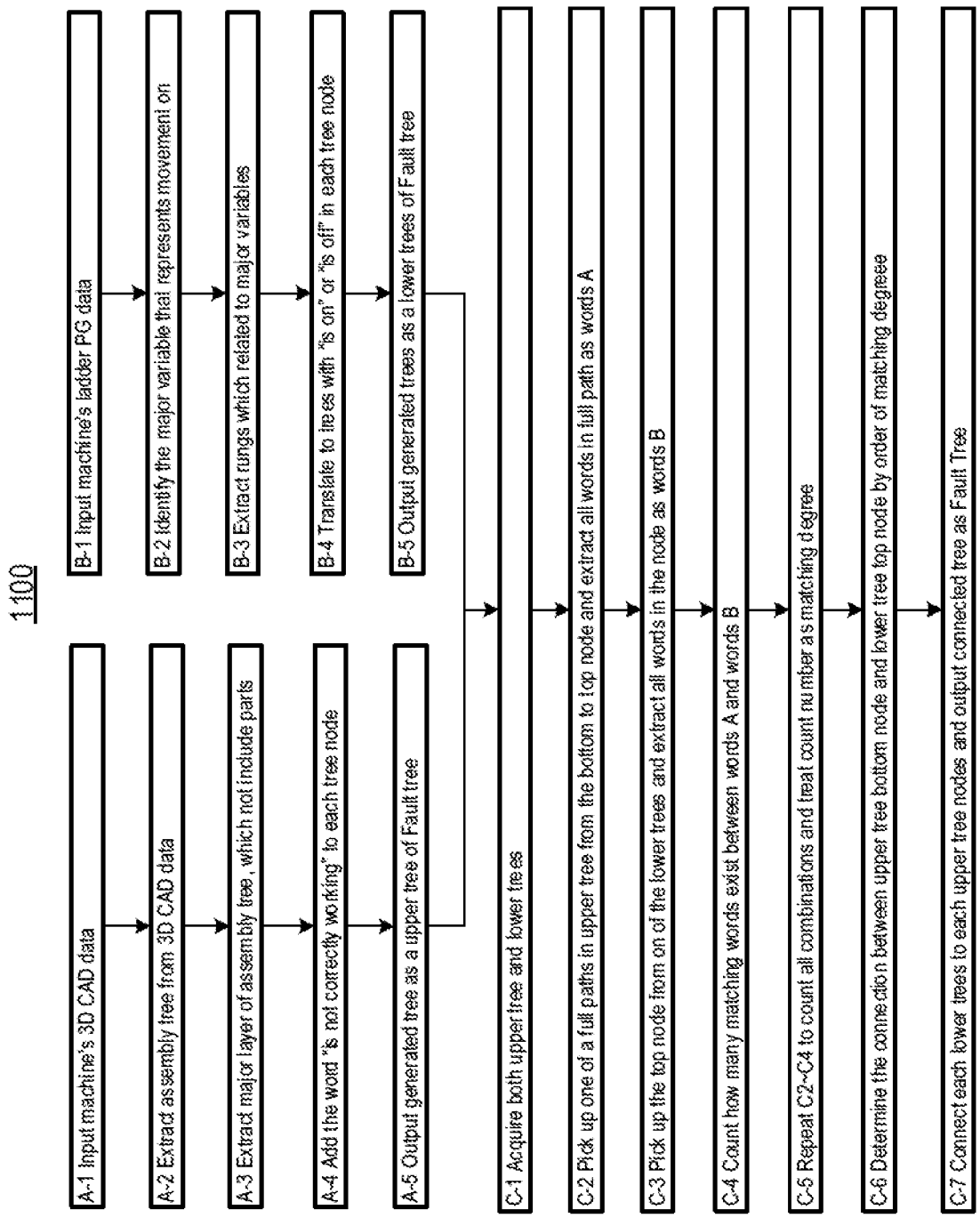
FIG. 11 is a diagram illustrating an example flow chart of the auto fault tree generation system.

FIG. 11 shows a flow chart 1100 of an Auto Fault Tree Generation system. Input data for A-1 is described, for example, in FIG. 6, and input data for BI is described, for example, in FIGS. 8-10. At A-2, an assembly tree may be extracted from A-1. At A-3, a major layer of the assembly tree, excluding parts, may be extracted. At A-4, each tree node may be appended with a message (e.g., "is not correctly working") related to an error. At A-5, an upper tree of the fault tree may be generated.

At B-2, major variables that represent movement may be identified. At B-3, rungs from the input ladder program that relate to the major variables for movement may be extracted. At B-4, each tree node may be translated to trees with a status message (e.g., "is on" or "is off"). At B-5, a lower tree of the fault tree may be generated.

At C-1, the generated upper tree and the lower tree may be acquired. At C-2, at least one of a full path in the upper tree from the bottom node to the top node is picked up, such that all the words in the full path picked up may be extracted as words A. At C-3, a top node from one of the lower trees is picked and all the words in the node are extracted as words B. At C-4, an amount of matching words between words A and words B is calculated. At C-5, the process of C2-C4 may be repeated to count all the combinations and treat the count numbers as a matching degree. At C-6, a connection between the upper tree bottom node and a lower tree top node may be determined based at least on an order of matching degree. At C-7, each of the lower trees and upper tree nodes may be connected, such that the output connected tree comprises the fault tree.

Figure 12:
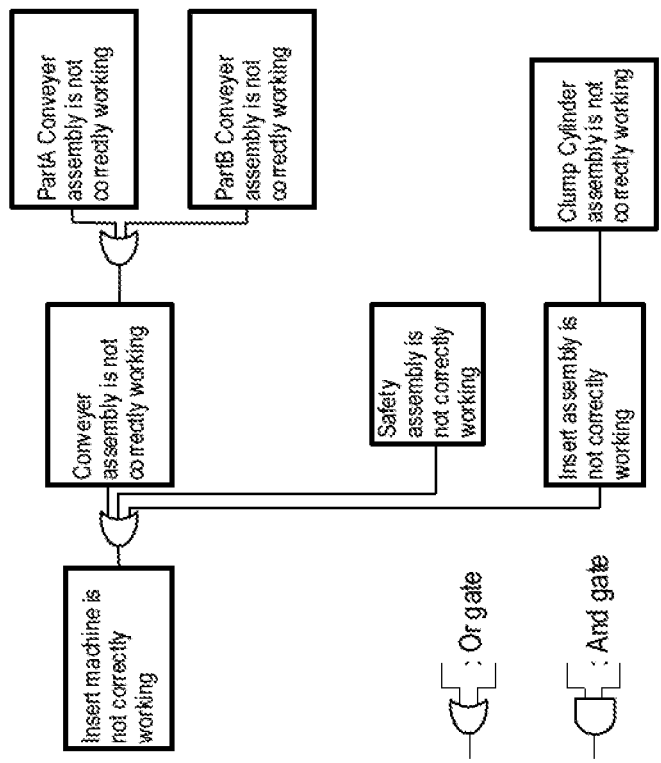
FIG. 12 is a diagram illustrating an example processing result of the flow chart of FIG. 11.

FIG. 12 shows the processing result after A-4 in FIG. 11, and may represent the upper part of the fault tree based on equipment structure. The fault tree may comprise at least one of a node, a branch, or a logic gate. The fault phenomena or its causes may be populated in the node, and each related node is connected with a line called a branch. With this connection, an upper node is called the parent node of the lower node, and a lower node is called the child node of the upper node. FIG. 12 shows an example of nodes, branches, and logic gates that may be used. However, the disclosure is not intended to be limited to the examples disclosed herein. In some examples, a different combination or number of nodes, branches, or logic gates may be used.

Figure 13:
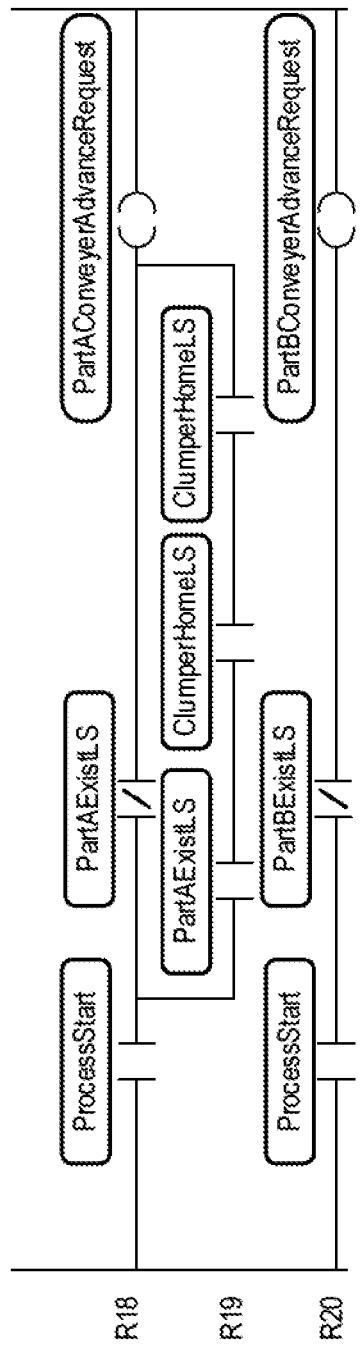
FIG. 13 is a diagram illustrating an example processing result of the flow chart of FIG. 11.
Figure 14:
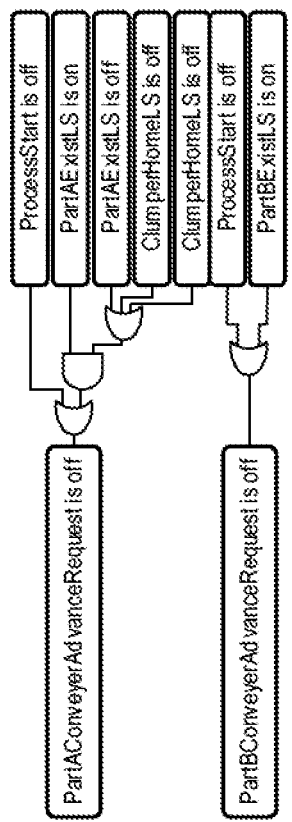
FIG. 14 is a diagram illustrating an example processing result of the flow chart of FIG. 11.
Figure 15:
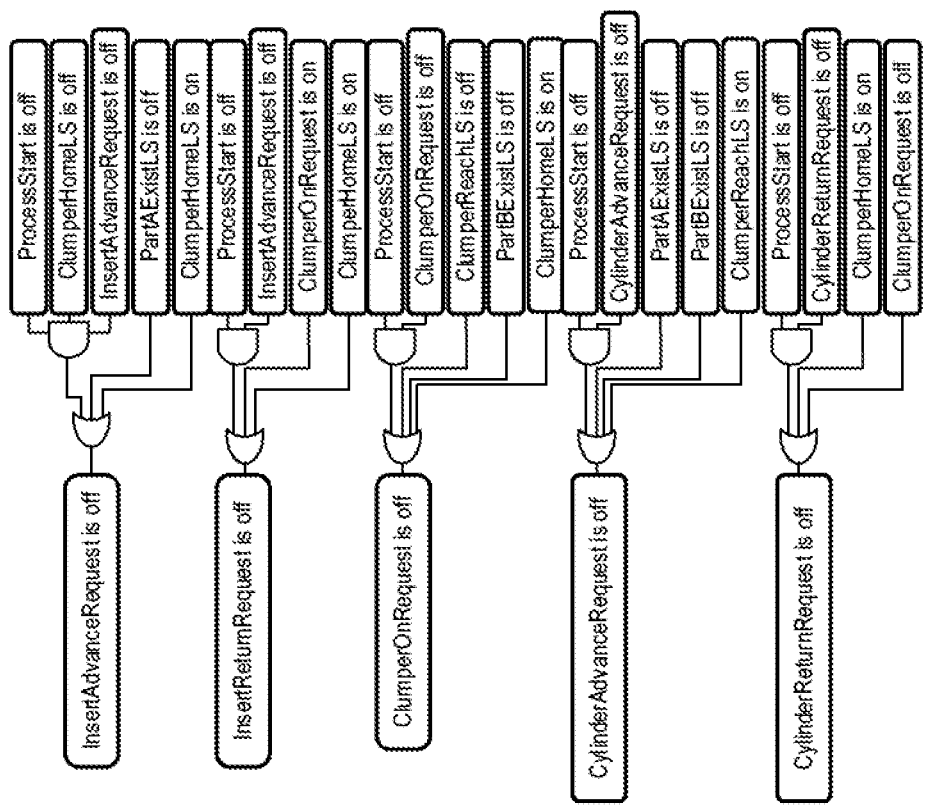
FIG. 15 is a diagram illustrating an example processing result of the flow chart of FIG. 11.

FIG. 13 shows the partial processing result after B-3 in FIG. 11. For example, the rungs R18-R20 may comprise the rungs used in the partial processing results after B-3 in FIG. 11. FIG. 14 shows the partial processing result after B-4 as an example of the processing procedure. The major variables may be selected in B-2 based on some rules. In this example equipment, the word "Request" is used to order movement, so major variables are selected by searching "Request" in all ladder program's variables. As discussed in FIG. 7, the ladder program may be translated to a tree diagram, as shown in FIG. 14. In some aspects, True and False may be translated with the word "is on" or "is off." FIG. 15 shows an example of the processing results after B-4 of FIG. 11. The trees of FIGS. 14 and 15 may comprise the lower part of the fault tree.

The partial fault trees are generated until A-4 and B-4 process, transferred to the connection module with A-5 and B-5 process, and acquired with the C-1 process for connection. The connection procedure starts from the C-2 process through word matching calculation to generate a full fault tree by connecting the upper and lower part of fault trees. The word matching calculation may utilize a source words group and target words group.

FIG. 16 shows an example 1600 of the words group extracted from the upper tree which may be utilized as source words, and FIG. 17 shows an example 1700 of the words group extracted from lower trees which may be utilized as target words. At least one advantage of the disclosure is utilizing a full path word instead of a bottom node of the upper tree, because the bottom node of the upper tree may not comprise all the words which describe the assigned function. The reason is that the upper tree is a generated tree diagram, such that the node names are not overlapped. In some aspects, the lower tree is generated from program variables, such that these variables have a unique name throughout the program. Utilizing the full path in the upper tree is beneficial and may allow for a precise match.

The rule of matching count is "How many FPX words existing TNY," meaning C-4 in FIG. 11, and the calculated result 1800 is shown in FIG. 18. To determine the connecting nodes, a deviation calculation 1900 is calculated to represent the difference from the mean, as shown in FIG. 19.

The example determination rules are as follows.
1. Select the highest deviation value in the TNX row
2. If the parent node and children node have the same score, select the children node.

Figure 22:
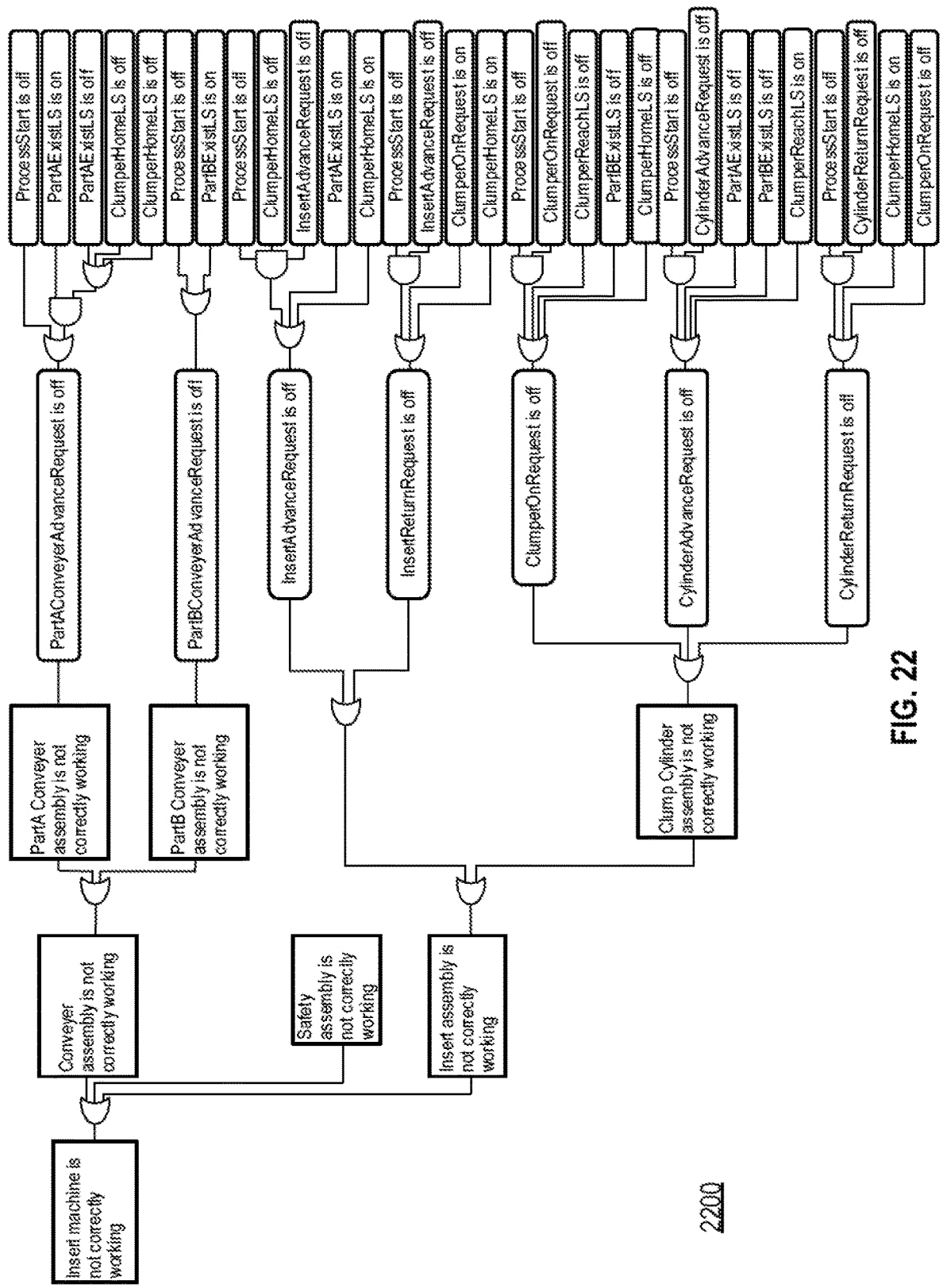
FIG. 22 is a diagram illustrating an example processing result of the flow chart of FIG. 11.

FIG. 20 shows an example 2000 of the selected connection with the bold lettering. For example, TN1 and FP3 provide a connection; TN2 and FP4 provide a connection: TN3 and FP7 provide a connection; TN4 and FP7 provide a connection; TN5 and FP7 provide a connection; TN6 and FP6 provide a connection; and TN7 and FP6 provide a connection. FIG. 21 shows an example 2100 of matching accuracy, and it shows every connection matching correctly. FIG. 22 shows an example 2200 of the final fault tree, which may be the output from the flow chart in FIG. 11.

Figure 23:
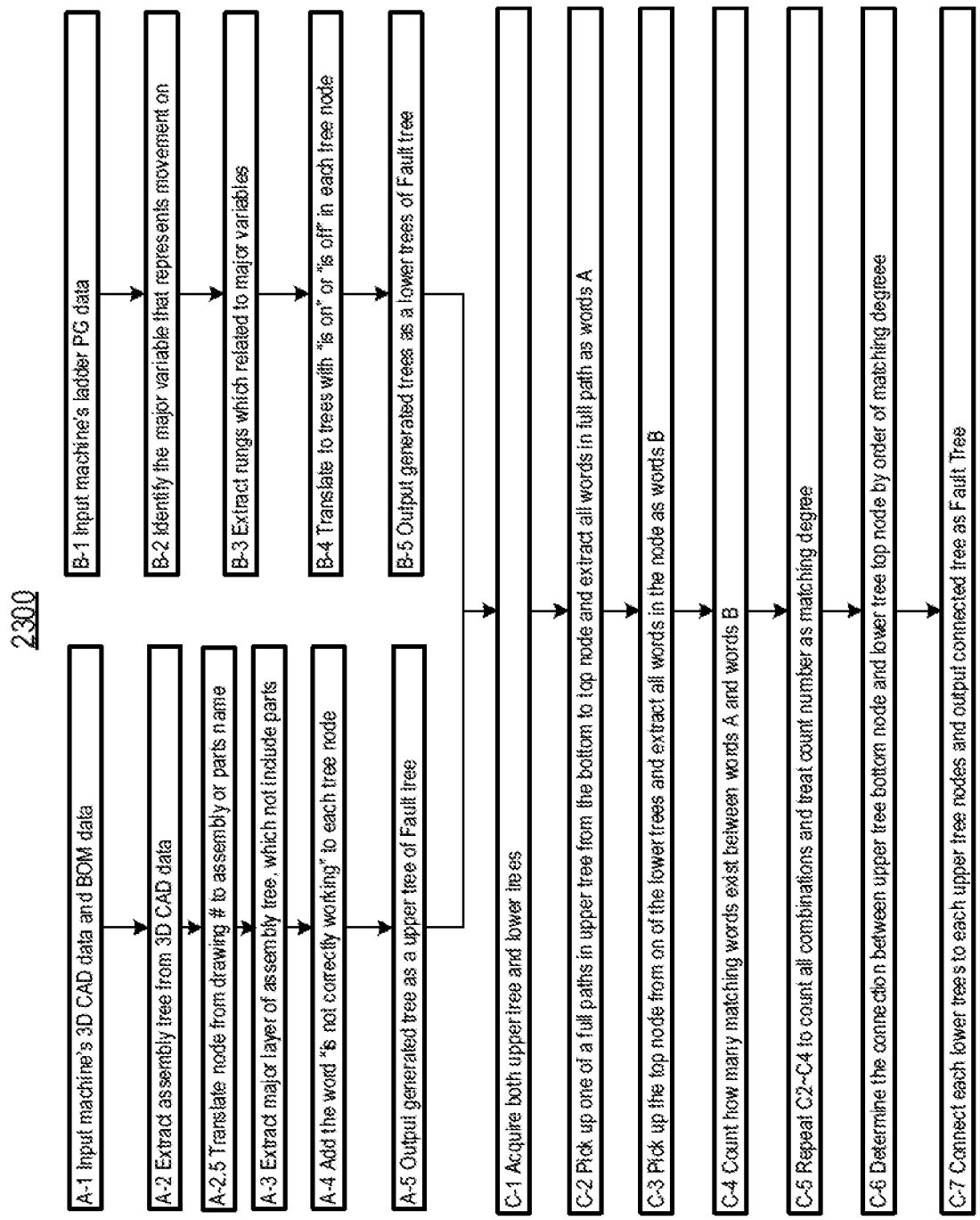
FIG. 23 is a diagram illustrating an example flow chart of the auto fault tree generation system.
Figure 24:
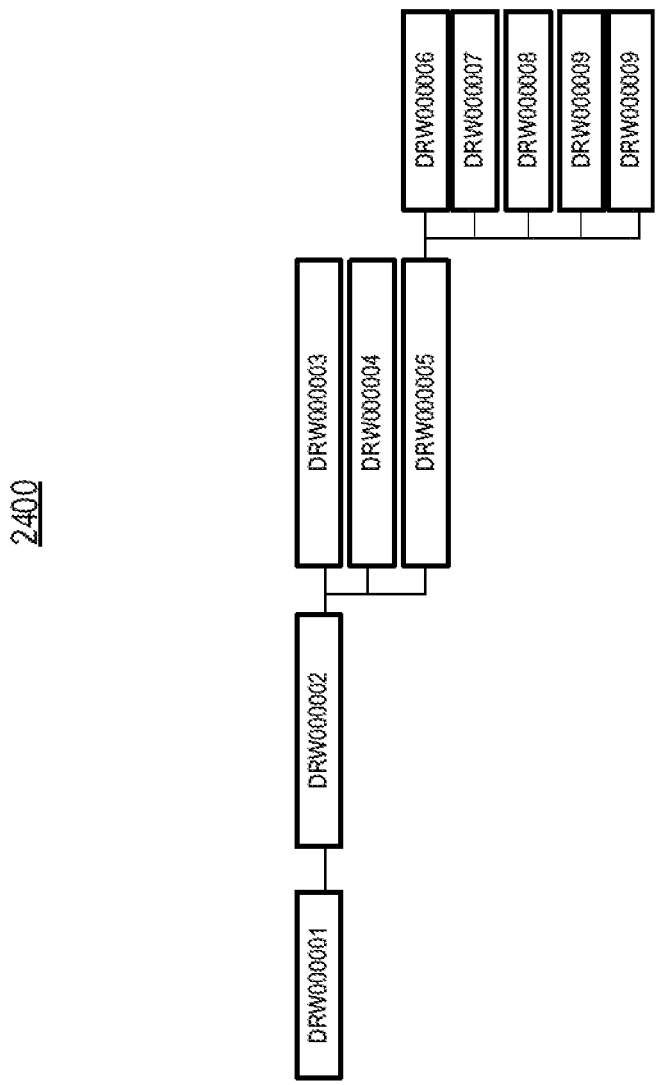
FIG. 24 is a diagram illustrating an example assembly data.

FIG. 23 shows an example flow chart 2300 of the auto fault tree generation system. The flow chart of FIG. 23 is similar to the flow chart of the auto fault tree generation system of FIG. 11, but there are some differences. For example, a difference between the flow chart of FIG. 11 and FIG. 23 is step A-1 and A-2.5 of FIG. 23. Step A-1 includes input data is not only CAD data 2400 shown in FIG. 24, but may also comprise bill of material (BOM) data 2500, as shown for example in FIG. 25. In some instances, the drawing number name is used in CAD data for describing the assembly tree may utilize BOM data for translation from drawing number to assembly or part name. With this translation, the same calculation with example flow chart of FIG. 11 may be established even if the assembly data is separated to CAD data and BOM data. As such, the flow chart of FIG. 23 may generate an upper tree and a lower tree of the fault tree, similarly as in the example of FIG. 11.

Figure 26:
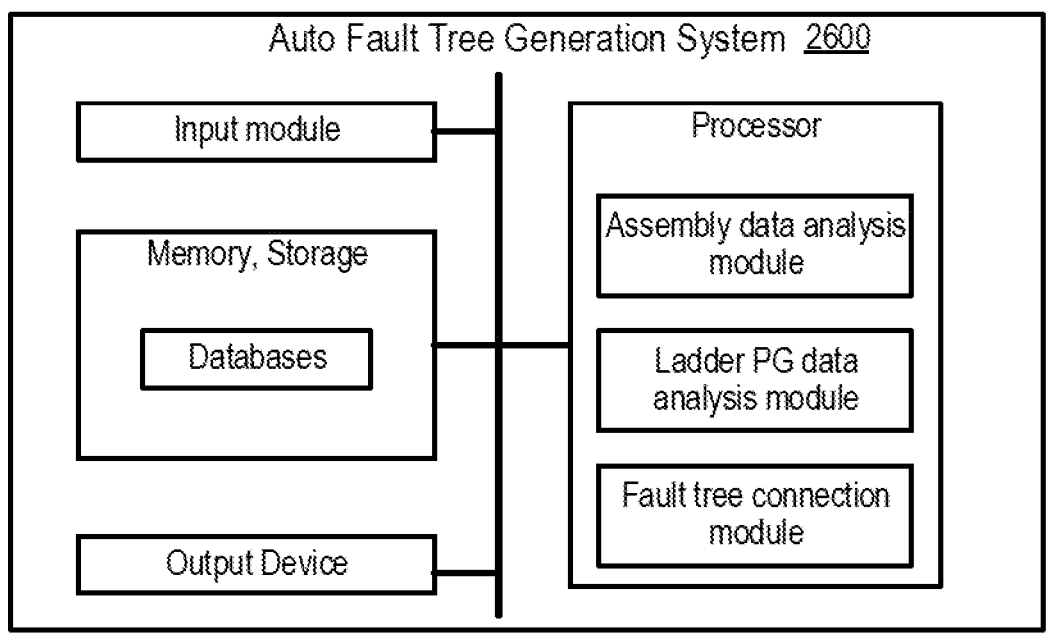
FIG. 26 is a diagram illustrating an example architecture of an auto fault tree generation system.
Figure 27:
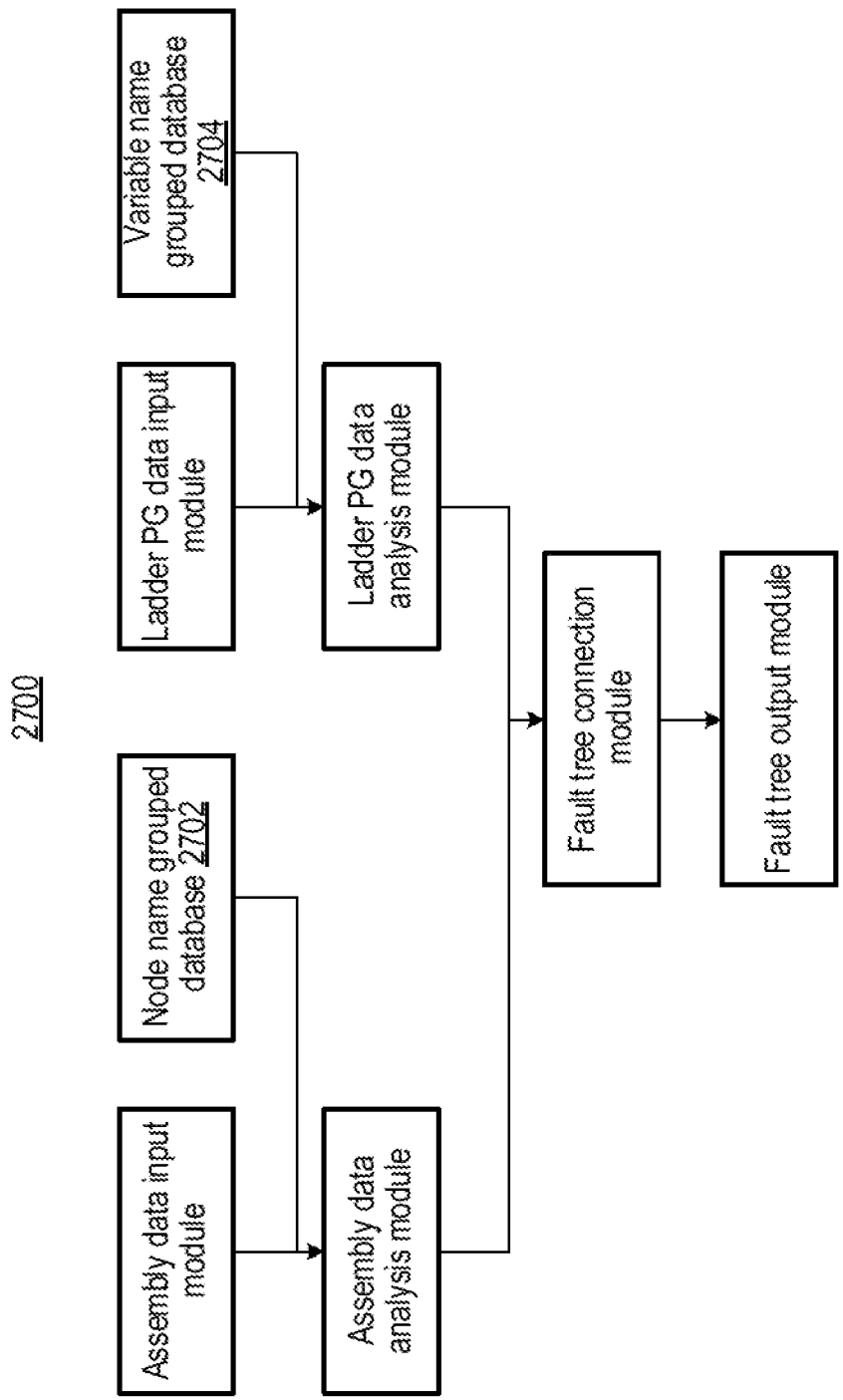
FIG. 27 is a diagram illustrating an example of a block diagram of the auto fault tree generation system.

FIG. 26 provides an example architecture of an auto fault tree generation system 2600. The example architecture of an auto fault tree generation system of FIG. 26 may have the same components and functions as the example architecture of an auto fault tree generation system of FIG. 1. FIG. 27 shows an example of a block diagram 2700 of the system. The block diagram shown in FIG. 27 is similar to the block diagram of the system shown in FIG. 2, but has some differences. For example, a difference from the block diagram of FIG. 2 is that some databases are used in the analysis module, whereas in the block diagram of FIG. 27 some groups defined in the database are used in the connection process, such that assembly data analysis module output is based on input from the assembly data input module and input from a node name grouped database 2702. In addition, output from the ladder data analysis module is based on input from the ladder data input module and a variable name grouped database 2704.

Figure 28:
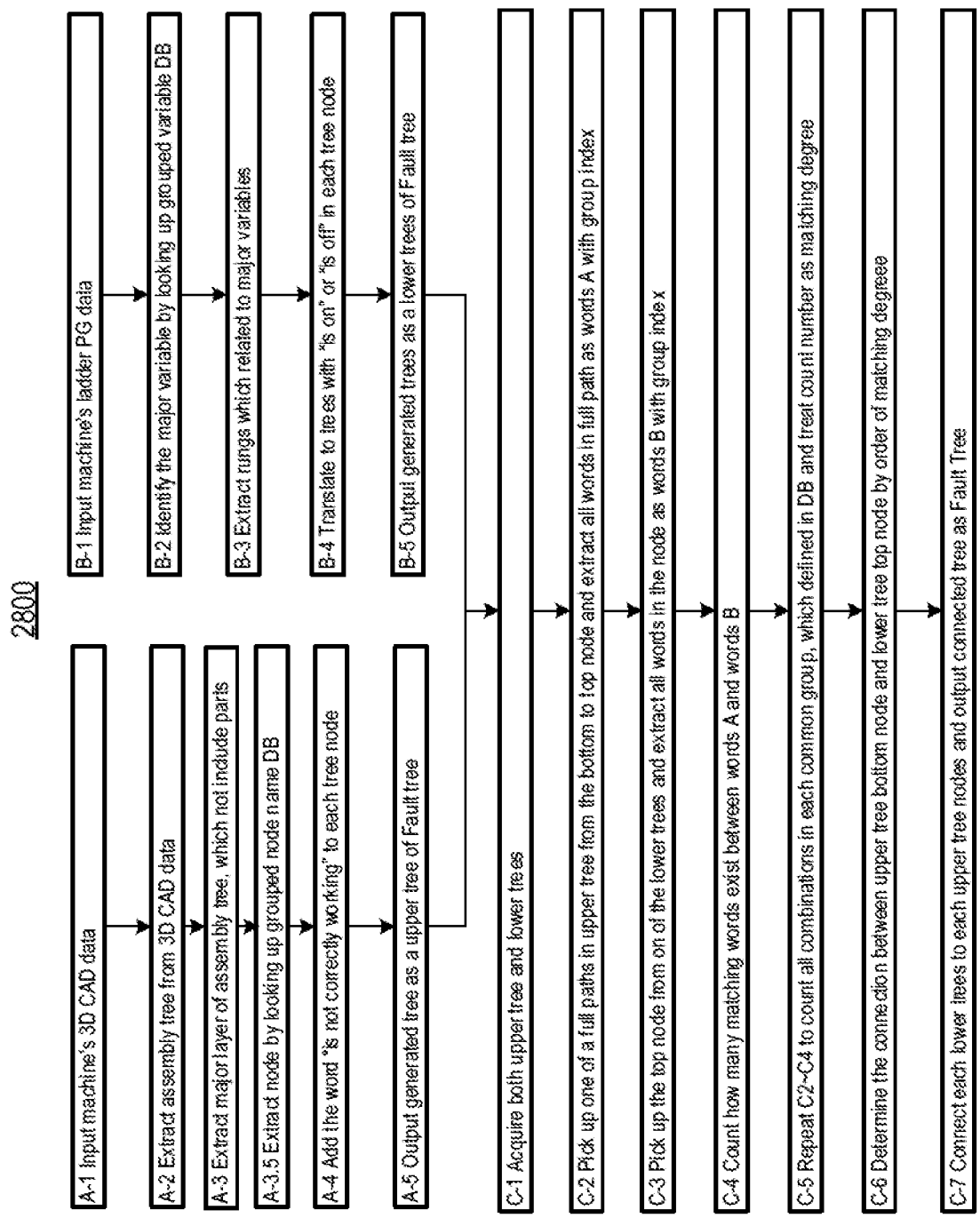
FIG. 28 is a diagram illustrating an example flow chart of the auto fault tree generation system.

FIG. 28 shows an example flow chart 2800 of the auto fault tree generation system, and FIG. 29 shows an example 2900 of the node name grouped database 2702. The example flow chart of FIG. 28 is configured similarly to the flow chart of FIG. 11, but includes and additional step, namely, A-3.5. At A-3.5, a node may be extracted by looking up a grouped node name database. The grouped node database shown is used for searching nodes in the A-3.5 process in FIG. 28 to extract important nodes from the assembly tree, such as the drive unit and measurement unit.

Figure 30:
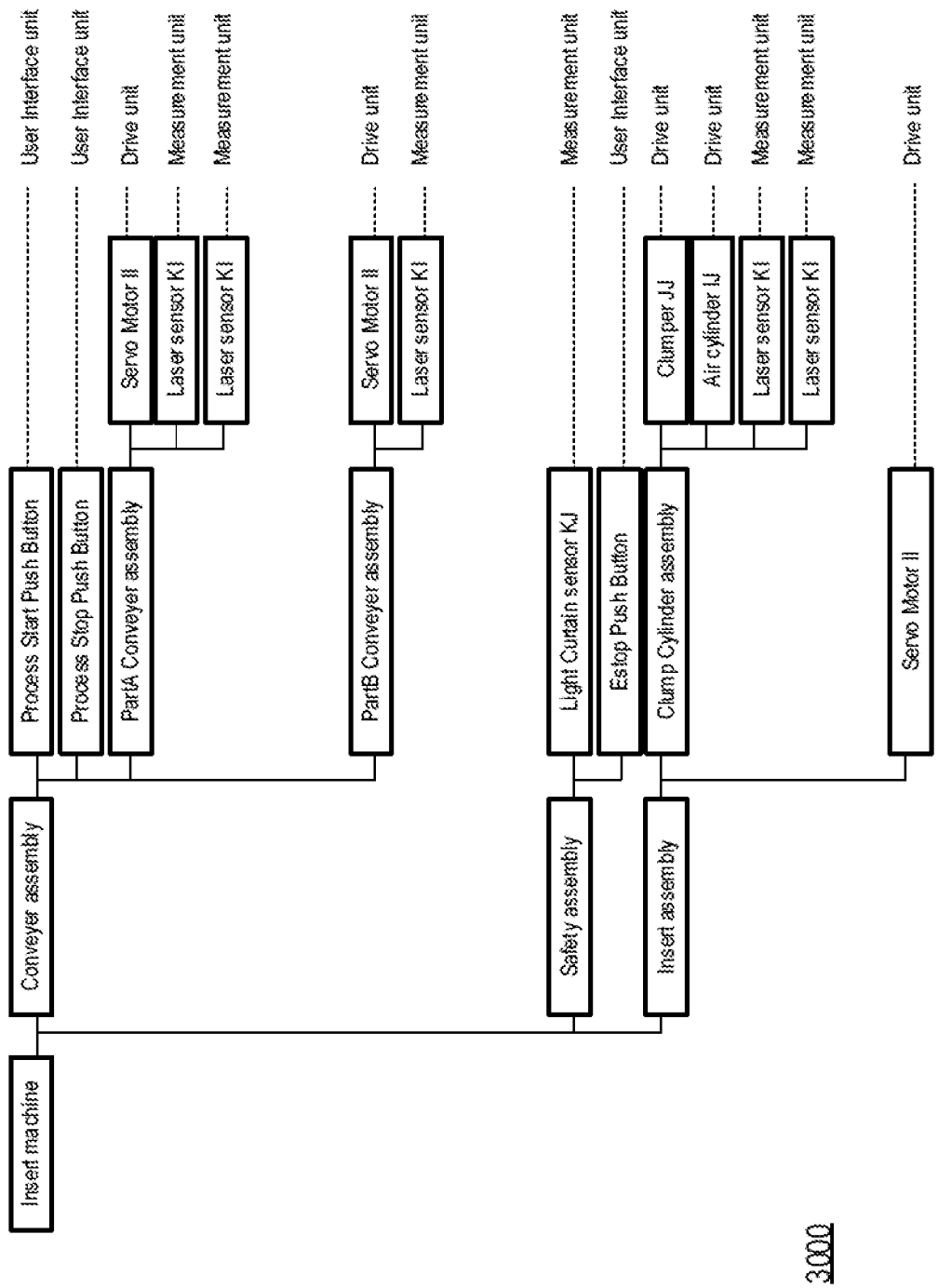
FIG. 30 is a diagram illustrating an example processing result of the flow chart of FIG. 23.

FIG. 30 shows an example 3000 of the processing result after the A-3.5 process in FIG. 28. Based on the database utilization, the detailed key component can be extracted, such as but not limited to, motors and laser sensors which may be a possible root cause of the fault.

Figure 32:
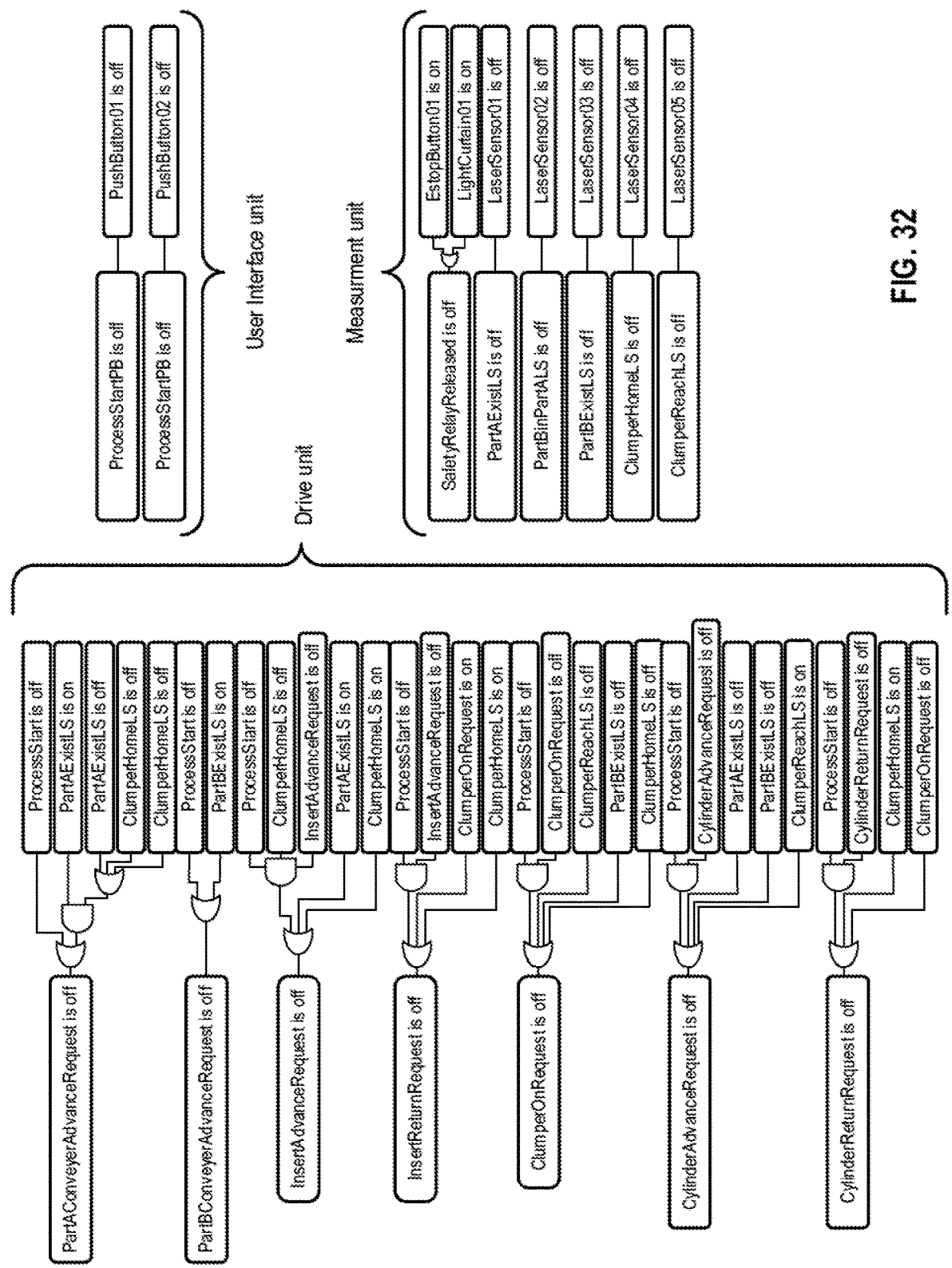
FIG. 32 is a diagram illustrating an example processing result of the flow chart of FIG. 23.

FIG. 31 shows an example 3100 of the variable name grouped database 2704, which may be used at B-2 in the example process of FIG. 28. The variables in the program comprise name variables which may indicate unique and/or express function. In some instances, variables may comprise shortened names, such as but not limited to LS (laser sensor). LC (light curtain), PB (push button), or the like. The variable database can extract key variables related to key logic correctly. FIG. 32 shows the processing result after B-4 in FIG. 28 where multiple lower fault trees can be extracted with variables name utilization.

FIG. 33 shows an example 3300 of the words group extracted from the upper tree as source words, while FIG. 34 shows an example 3400 of the words group extracted from lower trees as target words. At least another difference from the prior example is utilizing a group that included both FIGS. 33 and 34 in the connection process. The matching calculation is conducted using internal groups in an effort to reduce missed matching due to the increased combination.

Figure 35:
FIG. 35 is a diagram illustrating an example of matching accuracy.
Figure 36:
FIG. 36 is a diagram illustrating an example of matching accuracy.

FIG. 35 shows an example 3500 of calculations conducted without the group information, and FIG. 36 shows an example 3600 of calculations conducted with the group information. After calculating in the internal group, the result is combined. Based on the comparison between FIGS. 35 and 36, the matching accuracy is increased due in part to the group information. Also, calculating time is reduced with separate calculations.

The system disclosed may be configured to generate a fault tree with a design document and minimized rules or database. Utilizing the system, the design term can be shortened to reduce design costs related to design for maintainability, and the built-in alarm function can be optimized before shipping equipment or production line to reduce field issues after shipment. Also, increase the ease of the design of new architecture equipment or line to increase and expand the equipment builder or line builder business. Utilizing generated Fault Tree, the technology transfer between the design team and support team can be achieved to increase support efficiency. Utilizing generated Fault Tree, the equipment customer can minimize the downtime based on the reduction of missed root cause analysis, correct rapid root cause identification, and reduction of calling time to vendor support.

Figure 37:
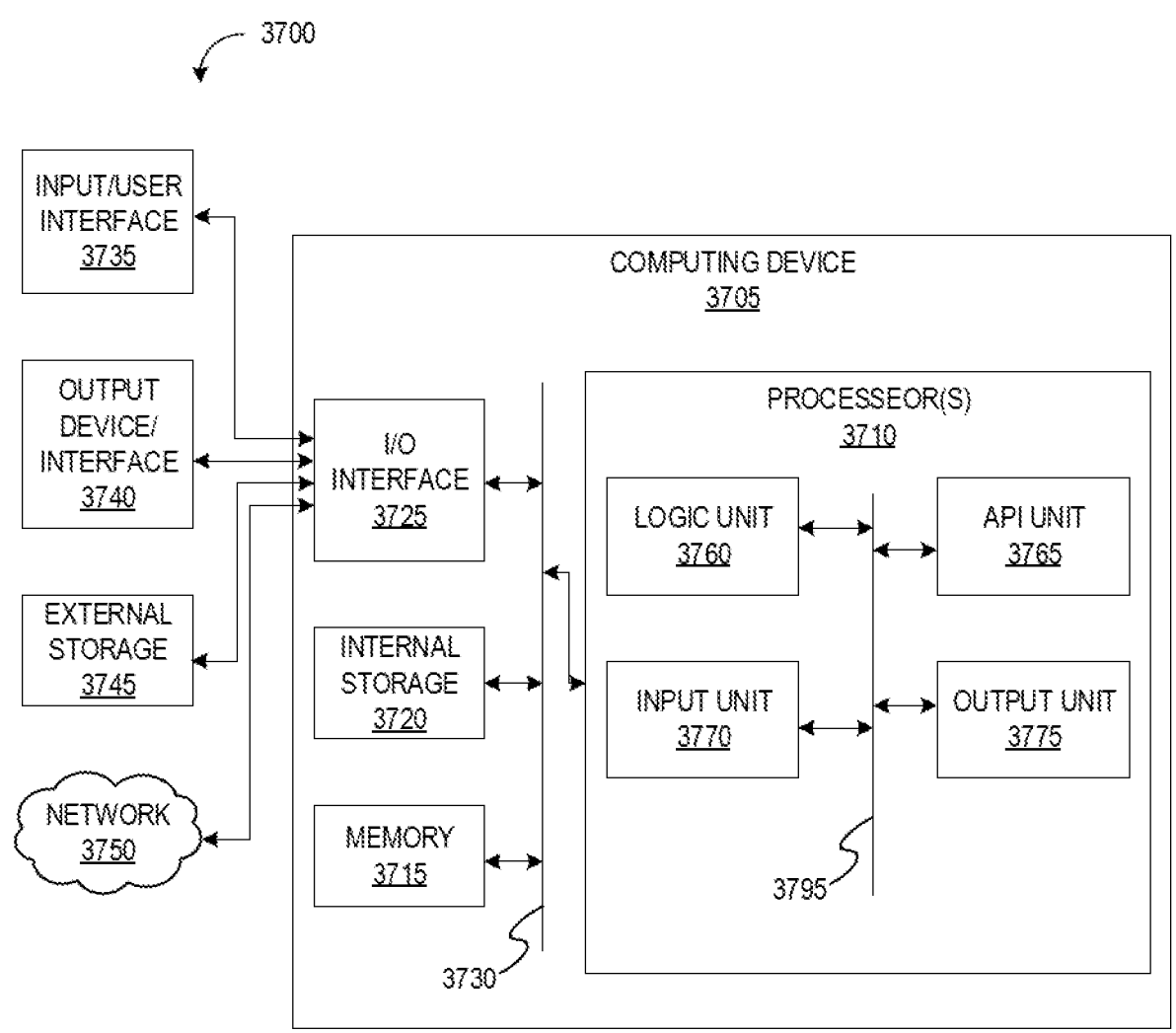
FIG. 37 illustrates an example computing environment with an example computer device suitable for use in some example implementations.

FIG. 37 illustrates an example computing environment with an example computer device suitable for use in some example implementations, as shown in connection with any of FIGS. 1-36. The computing environment can be used to facilitate implementation of the architectures illustrated in FIGS. 1-36. Further, any of the example implementations described herein can be implemented based on the architectures, APIs, microservice systems, and so on as illustrated in FIGS. 1-36. Computer device 3705 in computing environment 3700 can include one or more processing units, cores, or processors 3710, memory 3715 (e.g., RAM, ROM, and/or the like), internal storage 3720 (e.g., magnetic, optical, solid state storage, and/or organic), and/or I/O interface 3725, any of which can be coupled on a communication mechanism or bus 3730 for communicating information or embedded in the computer device 3705. I/O interface 3725 is also configured to receive images from cameras or provide images to projectors or displays, depending on the desired implementation.

Computer device 3705 can be communicatively coupled to input/user interface 3735 and output device/interface 3740. Either one or both of input/user interface 3735 and output device/interface 3740 can be a wired or wireless interface and can be detachable. Input/user interface 3735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 3740 may include a display, television, monitor, printer, speaker, braille, or the like. In some example implementations, input/user interface 3735 and output device/interface 3740 can be embedded with or physically coupled to the computer device 3705. In other example implementations, other computer devices may function as or provide the functions of input/user interface 3735 and output device/interface 3740 for a computer device 3705.

Examples of computer device 3705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 3705 can be communicatively coupled (e.g., via I/O interface 3725) to external storage 3745 and network 3750 for communicating with any number of networked components, devices, and systems, including one or more computer devices of the same or different configuration. Computer device 3705 or any connected computer device can be functioning as, providing services of, or referred to as a server, client, thin server, general machine, special-purpose machine, or another label.

I/O interface 3725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 3700. Network 3750 can be any network or combination of networks (e.g., the Internet, local area network, wide area network, a telephonic network, a cellular network, satellite network, and the like).

Computer device 3705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 3705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 3710 can execute under any operating system (OS) (not shown), in a native or virtual environment. One or more applications can be deployed that include logic unit 3760, application programming interface (API) unit 3765, input unit 3770, output unit 3775, and inter-unit communication mechanism 3795 for the different units to communicate with each other, with the OS, and with other applications (not shown). The described units and elements can be varied in design, function, configuration, or implementation and are not limited to the descriptions provided. Processor(s) 3710 can be in the form of hardware processors such as central processing units (CPUs) or in a combination of hardware and software units.

In some example implementations, when information or an execution instruction is received by API unit 3765, it may be communicated to one or more other units (e.g., logic unit 3760, input unit 3770, output unit 3775). In some instances, logic unit 3760 may be configured to control the information flow among the units and direct the services provided by API unit 3725, input unit 3770, output unit 3775, in some example implementations described above. For example, the flow of one or more processes or implementations may be controlled by logic unit 3760 alone or in conjunction with API unit 3765. The input unit 3770 may be configured to obtain input for the calculations described in the example implementations, and the output unit 3775 may be configured to provide output based on the calculations described in example implementations.

Processor(s) 3710 can be configured to execute instructions for a method, the instructions involving receiving, as input, assembly data and one or more ladder programs, wherein the assembly data comprises equipment or line assembly trees and the one or more ladder programs comprising equipment or line control logic; and generating a fault tree associated with an equipment architecture based on an assembly tree structure comprised in the assembly data and a control logic comprised in the one or more ladder programs, for example, in any of FIGS. 1 to 36.

Processor(s) 3710 can be configured to execute instructions for a method, the method connecting an upper part of a first fault tree based on the assembly tree structure comprised in the assembly data with a lower part of a second fault tree based on the control logic comprised in the one or more ladder programs, for example, in any of FIGS. 1 to 36.

Processor(s) 3710 can be configured to execute instructions for a method, the method involving extracting one or more components of the equipment architecture from the equipment or line assembly trees in the assembly data based on a part name database identifying each of the one or more components from the upper part of the first fault tree, for example, in any of FIGS. 1 to 36.

Processor(s) 3710 can be configured to execute instructions for a method, the method involving extracting one or more variables from the equipment or line control logic based on a variable name database for one or more components of the equipment architecture; and extracting the assembly tree structure based on a ladder program associated with the one or more variables, for example, in any of FIGS. 1 to 36.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating." "determining," "displaying." or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
    receiving, as input, assembly data and one or more ladder programs, wherein the assembly data comprises equipment or line assembly trees and the one or more ladder programs comprising equipment or line control logic; and
    generating a fault tree associated with an equipment architecture based on an assembly tree structure comprised in the assembly data and a control logic comprised in the one or more ladder programs,
    wherein the generating the fault tree associated with the equipment architecture comprises connecting an upper part of a first fault tree based on the assembly tree structure comprised in the assembly data with a lower part of a second fault tree based on the control logic comprised in the one or more ladder programs,
    wherein the connecting the upper part of the first fault tree based on the assembly tree structure with the lower part of the second fault tree based on the control logic comprises:
        generating a first word group by performing extraction on at least one full path of the first fault tree;
        generating a second word group by performing extraction on a top node of the second fault tree;
        calculating a matching degree between the first word group and the second word group; and
        connecting the upper part of the first fault tree and the lower part of the second fault tree based on an order of the matching degree.

2. The method of claim 1, further comprising:
    extracting one or more components of the equipment architecture from the equipment or line assembly trees in the assembly data based on a part name database identifying each of the one or more components from the upper part of the first fault tree.

3. The method of claim 1, wherein the generating the fault tree associated with the equipment architecture further comprising:
    extracting one or more variables from the equipment or line control logic based on a variable name database for one or more components of the equipment architecture; and
    extracting the assembly tree structure based on a ladder program associated with the one or more variables.

4. The method of claim 1, wherein a part name database and a variable name database of the fault tree comprise part names or variable names grouped in one or more common groups, wherein a connection of the first fault tree and the second fault tree is based on a grouping of the one or more common groups.

5. The method of claim 1, wherein the equipment or line assembly trees comprise related input and output variables in the one or more ladder programs.

6. The method of claim 1, wherein the fault tree associated with the equipment architecture comprises one or more nodes, one or more branches, and one or more logic gates.

7. The method of claim 6, wherein the one or more nodes comprise information related to a fault event, wherein each of the one or more nodes is connected with a respective branch of the one or more branches.

8. The method of claim 6, wherein the one or more logic gates are connected between an upper part of a first fault tree and a lower part of a second fault tree.

9. A non-transitory computer readable medium, storing instructions for execution by one or more hardware processors, the instructions comprising:
  receiving, as input, assembly data and one or more ladder programs, wherein the assembly data comprises equipment or line assembly trees and the one or more ladder programs comprising equipment or line control logic; and
  generating a fault tree associated with an equipment architecture based on an assembly tree structure comprised in the assembly data and a control logic comprised in the one or more ladder programs,
  wherein the generating the fault tree associated with the equipment architecture comprises connecting an upper part of a first fault tree based on the assembly tree structure comprised in the assembly data with a lower part of a second fault tree based on the control logic comprised in the one or more ladder programs,
  wherein the connecting the upper part of the first fault tree based on the assembly tree structure with the lower part of the second fault tree based on the control logic comprises:
    generating a first word group by performing extraction on at least one full path of the first fault tree;
    generating a second word group by performing extraction on a top node of the second fault tree;
    calculating a matching degree between the first word group and the second word group; and
    connecting the upper part of the first fault tree and the lower part of the second fault tree based on an order of the matching degree.

10. The non-transitory computer readable medium of claim 9, the instructions further comprising:
  extracting one or more components of the equipment architecture from the equipment or line assembly trees in the assembly data based on a part name database identifying each of the one or more components from the upper part of the first fault tree.

11. The non-transitory computer readable medium of claim 9, the instructions further comprising:
  extracting one or more variables from the equipment or line control logic based on a variable name database for one or more components of the equipment architecture; and
  extracting the assembly tree structure based on a ladder program associated with the one or more variables.

12. The non-transitory computer readable medium of claim 9, wherein a part name database and a variable name database of the fault tree comprise part names or variable names grouped in one or more common groups, wherein a connection of the first fault tree and the second fault tree is based on a grouping of the one or more common groups.

13. The non-transitory computer readable medium of claim 9, wherein the equipment or line assembly trees comprise related input and output variables in the one or more ladder programs.

14. The non-transitory computer readable medium of claim 9, wherein the fault tree associated with the equipment architecture comprises one or more nodes, one or more branches, and one or more logic gates, wherein the one or more nodes comprise information related to a fault event, wherein each of the one or more nodes is connected with a respective branch of the one or more branches, wherein the one or more logic gates are connected between an upper part of a first fault tree and a lower part of a second fault tree.

15. A system, comprising:
  an equipment architecture based on an assembly tree structure; and
  a processor, configured to:
    receive, as input, assembly data and one or more ladder programs, wherein the assembly data comprises equipment or line assembly trees and the one or more ladder programs comprising equipment or line control logic; and
    generate a fault tree associated with the equipment architecture based on the assembly tree structure comprised in the assembly data and a control logic comprised in the one or more ladder programs,
    wherein the generate the fault tree associated with the equipment architecture comprises connect an upper part of a first fault tree based on the assembly tree structure comprised in the assembly data with a lower part of a second fault tree based on the control logic comprised in the one or more ladder programs,
    wherein the connect the upper part of the first fault tree based on the assembly tree structure with the lower part of the second fault tree based on the control logic comprises:
      generate a first word group by performing extraction on at least one full path of the first fault tree;
      generate a second word group by performing extraction on a top node of the second fault tree;
      calculate a matching degree between the first word group and the second word group; and
      connect the upper part of the first fault tree and the lower part of the second fault tree based on an order of the matching degree.

* * * * *